US009451464B2

(12) United States Patent
Fan et al.

(10) Patent No.: US 9,451,464 B2
(45) Date of Patent: Sep. 20, 2016

(54) METHOD, APPARATUS AND SYSTEM FOR NETWORK ACCESS

(71) Applicant: Tencent Technology (Shenzhen) Company Limited, Shenzhen (CN)

(72) Inventors: Liangliang Fan, Shenzhen (CN); Xiangyao Lin, Shenzhen (CN); Kai Liu, Shenzhen (CN); Lejun Liu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 38 days.

(21) Appl. No.: 14/492,946

(22) Filed: Sep. 22, 2014

(65) Prior Publication Data

US 2015/0072653 A1  Mar. 12, 2015

Related U.S. Application Data

(63) Continuation of application No. PCT/CN2014/077146, filed on May 9, 2014.

(30) Foreign Application Priority Data

Sep. 11, 2013 (CN) .......................... 2013 1 0412690

(51) Int. Cl.
*H04W 12/08* (2009.01)
*H04W 12/06* (2009.01)
(Continued)

(52) U.S. Cl.
CPC .......... *H04W 12/08* (2013.01); *H04L 12/2803* (2013.01); *H04L 12/2807* (2013.01); *H04W 12/04* (2013.01); *H04W 12/06* (2013.01); *H04W 76/02* (2013.01); *H04W 84/12* (2013.01)

(58) Field of Classification Search
CPC ... H04W 12/06; H04W 12/08; H04W 12/00; H04W 12/04; H04W 4/008; H04W 8/22; H04W 76/02; H04W 88/02; H04W 84/12; H04W 4/003; H04W 8/18; H04W 40/248; H04W 8/08; H04L 12/2803; H04L 12/2807

USPC .................................. 455/410–411, 418–420
See application file for complete search history.

(56) References Cited

U.S. PATENT DOCUMENTS 9,049,567 B2* 6/2015 Le Guen ................ G08B 25/10
2009/0064283 A1* 3/2009 Chen ..................... H04L 63/083
726/4

(Continued)

FOREIGN PATENT DOCUMENTS

CN     102457847 A     5/2012
CN     102547699 A     7/2012

(Continued)

OTHER PUBLICATIONS

Office Action issued in corresponding Chinese Application CN201310412690.7, pp. 1-5, dated Sep. 29, 2015.

(Continued)

*Primary Examiner* — Magdi Elhag
(74) *Attorney, Agent, or Firm* — Brinks Gilson & Lione

(57) ABSTRACT

The present disclosure provides a method, apparatus and system for readily and conveniently getting network access for a smart device. The method for network access for a smart device includes receiving, by a server comprising a processor and a non-transitory storage medium, a first identification identifying a wireless access point and a first terminal identifier; receiving a second identification identifying a smart device and a second terminal identifier; associating the wireless access point with the smart device if the first terminal identifier corresponds to the second terminal identifier, and sending the second identification for the associated smart device to the wireless access point. The wireless access point provides network access authentication information to the smart device so that the smart device can get access to a network provided by the wireless access point with the network access authentication information.

15 Claims, 10 Drawing Sheets

(51) Int. Cl.
*H04W 76/02* (2009.01)
*H04L 12/28* (2006.01)
*H04W 12/04* (2009.01)
*H04W 84/12* (2009.01)

(56) References Cited

U.S. PATENT DOCUMENTS

| | | | | |
|---|---|---|---|---|
| 2009/0197571 | A1* | 8/2009 | Kitajima | H04W 12/06 455/411 |
| 2010/0293250 | A1* | 11/2010 | Ankaiah | H04L 12/56 709/219 |
| 2011/0026436 | A1* | 2/2011 | Karaoguz | H04L 12/2803 370/254 |
| 2012/0233672 | A1* | 9/2012 | Kezys | H04L 63/0428 726/5 |
| 2013/0223279 | A1* | 8/2013 | Tinnakornsrisuphap | H04L 41/0809 370/254 |
| 2014/0050167 | A1* | 2/2014 | Smedman | H04W 48/14 370/329 |
| 2014/0162600 | A1* | 6/2014 | Chang | H04W 12/06 455/411 |
| 2014/0282960 | A1* | 9/2014 | Tinnakornsrisuphap | H04L 63/083 726/7 |

FOREIGN PATENT DOCUMENTS

| | | |
|---|---|---|
| CN | 102594835 A | 7/2012 |
| CN | 102612033 A | 7/2012 |
| CN | 102946591 A | 2/2013 |
| EP | 2602949 A2 | 6/2013 |
| WO | WO 2015/035795 A1 | 3/2015 |

OTHER PUBLICATIONS

International Search Report issued in corresponding PCT Application No. PCT/CN2014/077146, pp. 1-2, mailed Mar. 19, 2015.

* cited by examiner ically a continuation of and claims priority
METHOD, APPARATUS AND SYSTEM FOR NETWORK ACCESS

CROSS-REFERENCE TO RELATED APPLICATIONS

This application is a continuation of and claims priority under 35 U.S.C. §365 and 35 U.S.C. §119 to PCT Application No. PCT/CN2014/077146, filed on May 9, 2014, which claims the benefit of priority to a Chinese Patent Application No. 201310412690.7, filed on Sep. 11, 2013, both of which are incorporated herein by reference in their entireties.

FIELD OF THE TECHNOLOGY

The present disclosure generally relates to internet field, and more particularly, to a method, apparatus and system for providing network access to a smart device.

BACKGROUND

More and more smart devices such as smart lights, smart fans and smart refrigerators are involved in our life and work. Terminals such as smart cell phones, tablet PC and laptop can be configured to control the smart devices to achieve various function with high efficiency.

It is necessary for the smart devices to set WIFI (Wireless Fidelity) password to access network while the smart devices achieve various function with high efficiency. Current methods for providing wireless network access to smart devices are carried out through configuring WPS encryption with a single key for wireless router, such that the access of the smart devices to the network is achieved. Both the smart devices and the wireless router must be subjected to WPS authentication, which is necessary for configuring WPS encryption with a single key, and both of them should be respectively provided with one button. For the smart devices with input screen, the said button may be a virtual button shown in the screen. For the smart devices without input screen such as intelligent light or intelligent fans, a solid button should be provided or mounted on these smart devices. The users press the button on the smart devices and then press the button on the wireless router to allow the smart devices to access network after selecting the WPS access point for the smart devices.

Thus, for most smart devices and wireless routers without input screen, they should be provided with a solid button. The network access is achieved through pressing this button. However, the design and configuration of the button is limited. For example, it is very difficult or unaesthetic to mount a button on some smart devices such as intelligent glasses. Therefore, the application of current method for wireless network access is limited. Additionally, the smart devices such as intelligent lights and intelligent conditioners are often mounted on the higher place or the place not easily reached by user. Therefore, current methods for wireless network access lack feasibility and versatility.

SUMMARY

To solve the limitation to the application of the methods for wireless network access and lack of feasibility and versatility, the present disclosure provides a method, apparatus and system to allow a smart device to get access to network more easily and conveniently.

One embodiment of the present disclosure includes a method for providing network access for a smart device by a server comprising a processor and a non-transitory storage medium. In this embodiment, the method includes receiving a first identification identifying a wireless access point and a first terminal identifier by the server. The server also receives a second identification identifying a smart device and a second terminal identifier. If the first terminal identifier corresponds to the second terminal identifier, the server then associates the wireless access point with the smart device and sends the second identification for the associated smart device to the wireless access point. The wireless access point then provides network access authentication information to the smart device so that the smart device is able to accesses a network provided by the wireless access point with the network access authentication information.

One embodiment discloses a method or program for providing network access for a smart device by a terminal comprising a processor and a non-transitory storage medium. In this embodiment, the method includes obtaining, by a terminal comprising a processor and a non-transitory storage medium, a first identification identifying a wireless access point. The terminal sends the first identification and a first account identifier identifying a first user account to a server. The terminal also obtains a second identification identifying a smart device and a second account identifier identifying a second user account to a server. The terminal sends the second identification and the second account identifier to the server, wherein the server associates the first identification with the second identification if the first account identifier corresponds to the second account identifier.

Another embodiment discloses a server apparatus for getting network access for a smart device. The server apparatus includes a processor and a non-transitory storage medium accessible to the processor, the non-transitory storage medium is configured to store modules comprising an identification receiving module configured to receive, from a first terminal, a first identification identifying a wireless access point associated with a first terminal identifier identifying the first terminal. The identification receiving module is also configured to receive a second identification identifying a smart device associated with a second terminal identifier identifying a second terminal from the second terminal. The non-transitory storage medium is also configured to store an identification relating module configured to associate the wireless access point with the smart device if the first terminal identifier corresponds to the second terminal identifier; and an identification pushing module configured to send the second identification for the associated smart device to the wireless access point, wherein the wireless access point provides network access authentication information thereof to the smart device and the smart device accesses a network provided by the wireless access point with the network access authentication information.

Another embodiment discloses a wireless access point apparatus for providing network access for a smart device. The wireless access point apparatus includes a machine-readable code configured to provide a first identification information of the wireless access point apparatus, a processor and a non-transitory storage medium accessible to the processor, wherein the non-transitory storage medium is configured to store modules comprising: a receiving identification module configured to receive a second identification of the smart device from a server after the server associates the first identification of the wireless access point apparatus to the second identification of the smart device; and a password sending module configured to provide network access authentication information required by the wireless access point apparatus to the smart device according to the second identification of the smart device.

Another embodiment discloses a smart device that can readily and conveniently get network access. The smart device includes a machine-readable code configured to provide an identification of the smart device to a terminal, wherein the terminal sends the identification to a server which associates the identification of the smart device with a wireless access point; a processor and a non-transitory storage medium accessible to the processor, wherein the non-transitory storage medium is configured to store modules comprising: a password obtaining module configured to receive network access authentication information of the wireless access point; and a network access module configured to access a network with the received network access authentication information.

Other features and advantages will be, or will become, apparent to one skilled in the art upon examination of the following figures and detailed description. It is intended that all such additional features and advantages included within this description be within the scope of the claims, and be protected by the following claims.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims. Apparently, the drawings described below only are certain embodiments of the present disclosure, the skilled in the art can obtain other drawings based on these drawings without creative work.

DETAILED DESCRIPTION OF THE EMBODIMENTS

The various embodiments of the present disclosure are further described in details in combination with accompanying drawings and embodiments below. Like numbered elements in the same or different drawings perform equivalent functions. It should be understood that the specific embodiments described here are used only to explain the present disclosure, and are not intended to limit the present disclosure."

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded.

Figure 1:
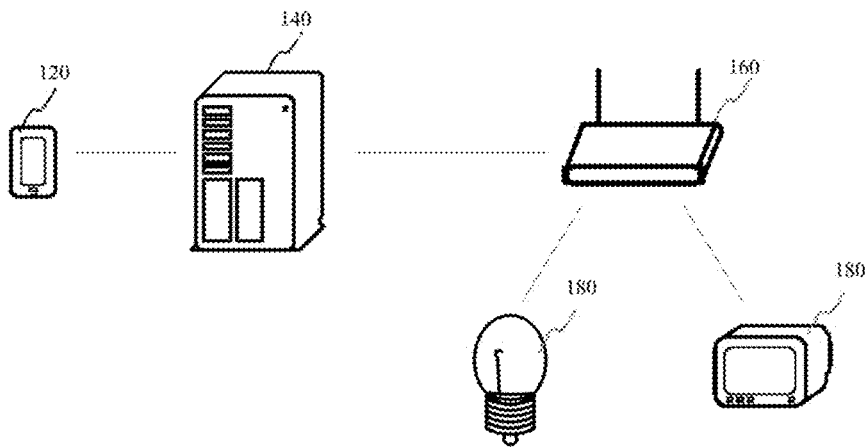
FIG. 1 is a schematic diagram of an application environment to which the method for network access relates according to various embodiments of the present disclosure.

FIG. 1 shows an application exemplary environment in which the method for network access is carried out according to various embodiments of the present disclosure. The environment includes a terminal 120, a server 140, a wireless access point 160 and two exemplary smart devices 180.

The terminal 120 may be a cell phone, a tablet PC, an electronic book reader, MP3 (Moving Picture Experts Group Audio Layer III) player, MP4 (Moving Picture Experts Group Audio Layer IV) player, laptop and desktop PC and the like. Alternatively, the terminal 120 can be just a software application running on the aforementioned electronic devices.

Each wireless access point 160 and each smart device 180 have their own identifications. The identification is the identifier for identifying the wireless access point 160 or the smart device 180. In one embodiment, the terminal 120 is provided with an application program for reading and identifying the identifier of the wireless access point 160 and the smart device 180. In one embodiment, an application program may generate identifier of terminal 120 for distinguishing various terminal users. In some embodiments, a terminal identifier can also be a user account associated with a software application, preferably when the terminal 120 is a software application. One terminal 120 may include a number of terminal users and the identifier is different from each other. The identifier can be a string. For example, the terminal 120 can be a cell phone with WeChat application program, a mobile text and voice messaging communication service developed by Tencent in China, and a WeChat account of a user is "117417255", and thus the account "117417255" will be the identifier of the terminal 120.

The terminal 120 can be connected with the server 140 via either wireless network or wired network.

The server 140 may be one server or server cluster consisting of several servers or a cloud computing service center. The server 140 saves the identifications of each wireless access point 160 and each smart device 180. In one embodiment, the server 140 also saves keys of each wireless access point 160 and each smart device 180. Both each wireless access point 160 and each smart device 180 have a key associated with its own identification, which may be generated randomly. The key may also be a string. The key is used for providing safeguard insurance for delivering messages among a smart device 180, a wireless access point 160 and a server 140. The encrypted information sent from communication peer can be read and decrypted merely via the key.

In one embodiment, the wireless access point 160 can be a router and each wireless access point 160 may have two SSIDs (Service Set Identifiers), SSID1 and SSID2. SSID is known as wireless network channel. In some embodiments, SSID1 is a normal wireless network channel, which may be encrypted. Any smart device is linked to network via the normal SSID1 through verifying the access password. In some embodiments of the present disclosure, SSID1 refers to a network provided by the wireless access point. SSID2 can be a special wireless network channel without encrypting, which is used for the smart device 180 to obtain network access authentication information, such as access password, of the wireless access point. In some embodiments of the present disclosure, SSID2 refers to a preset channel of the wireless access point. In these embodiments, the access password of the wireless access point can be the access password of SSID1. In some embodiments, a manufacturer can set the two SSIDs of wireless access point 160 according to properties and requirements of these two SSIDs. Alternatively, these two SSIDs can also be set via some specific open source router ROM (Read-Only Memory) firmware by a user, such as a third party firmware known as DD-WRT that can be configured to set some functions of a wireless router.

Meanwhile, in some embodiments, the wireless access point 160 need install a process which can be linked to the server 140 and can also monitor and communicate with the smart device 180. The process can also read the network access authentication information of the wireless access point.

The smart device 180 may be intelligent lights, fans, curtains, conditioners, electric cookers, refrigerators, watches, glasses and shoes and the like. It should be noted that the smart device 180 for the present disclosure does not require a display or input in it. The fields which the smart devices are involved in and the types of the smart devices are increasing with the development of technology. In some embodiments, the smart device includes a machine-readable code, either on the smart device, on or in the package of the smart device 180. In some embodiments, a machine-readable code can also be obtained online through the manufacturer's website. The machine-readable code comprises the identification information and key of the smart device 180. A user can scan machine-readable codes using the terminal, such as a smart phone having a camera, to obtain the identification identifying the smart device 180. The machine-readable codes include, but are not limited to, Universal Product Codes (UPC), quick response (QR) codes, Qode, MaxiCode, Data Matrix, PDF417, SPARQ-Code or the like. A machine-readable code can either be a 2-dimensional code, a 3-dimensional code or a multi-dimensional code. In some embodiments, the identification and key of each smart device 180 can also be saved in the chip thereof.

Figure 2A:
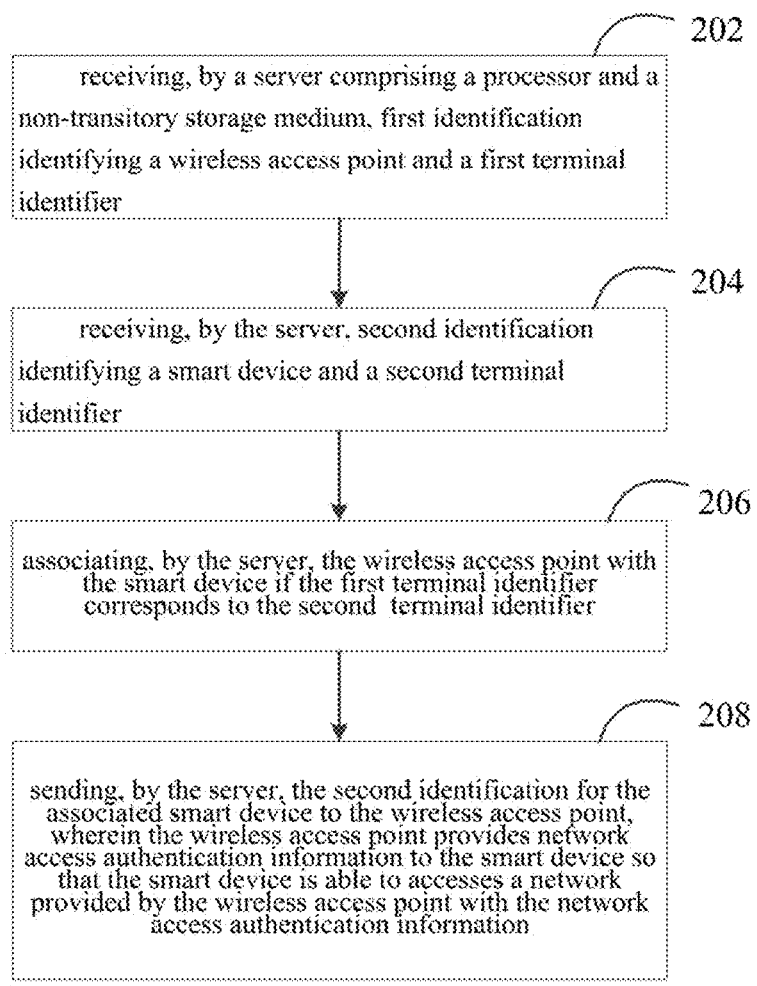
FIG. 2A is a flow chart of the method for network access according to one embodiment of the present disclosure.

FIG. 2A shows a flow chart of the method for network access according to one embodiment of the present disclosure. This embodiment is illustratively described in terms of the terminal in the environment as shown in FIG. 1 to which the method for network access is applied. It should be noted that this embodiment can also be applied in other environments. The method for network access includes:

step 202, receiving, by a server comprising a processor and a non-transitory storage medium, a first identification identifying a wireless access point and a first terminal identifier;

step 204, receiving, by the server, a second identification identifying a smart device and a second terminal identifier;

step 206, associating, by the server, the wireless access point with the smart device if the first terminal identifier corresponds to the second terminal identifier;

step 208, sending, by the server, the second identification for the associated smart device to the wireless access point, wherein the wireless access point provides network access authentication information to the smart device so that the smart device is configured to accesses a network provided by the wireless access point with the network access authentication information. The wireless access point 160 can indirectly or directly send the network access authentication information, such as access password of the wireless access point to the smart device through a preset channel according to the identification of the smart device and the smart device access the network provided by the wireless access point according to the access password.

In sum, the method for access network provided by the present embodiment readily and conveniently provide network access to the smart device through reading and identifying the identifications of the smart device and wireless access point via terminal and then sending them to server, and connecting the smart device and wireless access point via the server, such that the problem relating to the limitation to the application of the current methods for wireless network access and lack of feasibility and versatility is solved and the method for the access of the smart device to network is simplified, and further feasibility and versatility are enhanced.

Figure 2B:
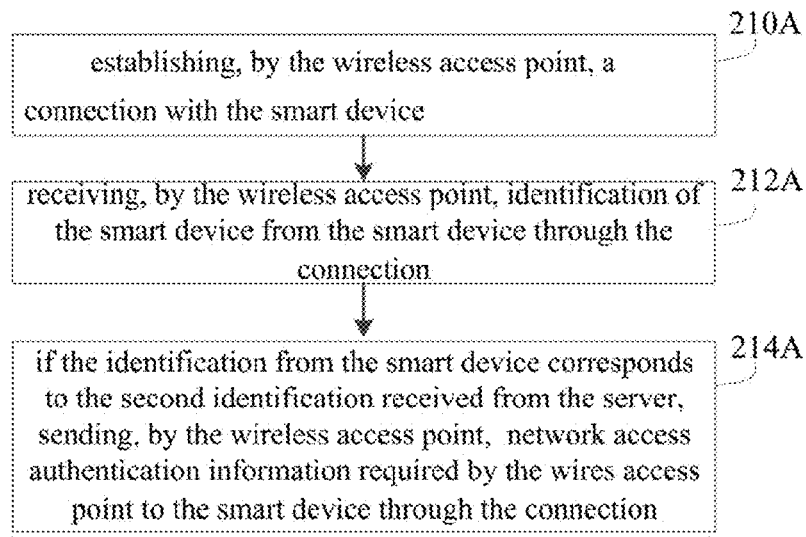
FIG. 2B is a flow chart of the method for network access according to another embodiment of the present disclosure.

FIG. 2B shows a flow chart of the method for network access according to another embodiment of the present disclosure. This embodiment is also illustratively described in terms of the server in the environment as shown in FIG. 1 to which the method for network access is applied. In this embodiment, the method includes the steps in FIG. 2A, and furthermore, the wireless access point 160 provides network access authentication information to the smart device 180 through the following steps:

step 210A, establishing, by the smart device, a connection with the wireless access point;

step 212A, receiving, by the wireless access point, identification of the smart device from the smart device through the connection;

step 214A, if the identification from the smart device corresponds to the second identification received from the server, sending, by the wireless access point, network access authentication information required by the wireless access point to the smart device through the connection.

In sum, according to the method for access network provided by the present embodiment, the access of the smart device 180 to the network is achieved by obtaining the identifications of the smart device 180 and wireless access point via the terminal 120 and then sending them to the server 140, and achieving the connection between the smart device 180 and wireless access point 160 via the server. Thus, the present disclosure can solve the problem relating to the limitation to the application of the methods for wireless network access and lack of feasibility and versatility and provide a simplified method for linking the smart device to network with enhanced feasibility and versatility.

Figure 2C:
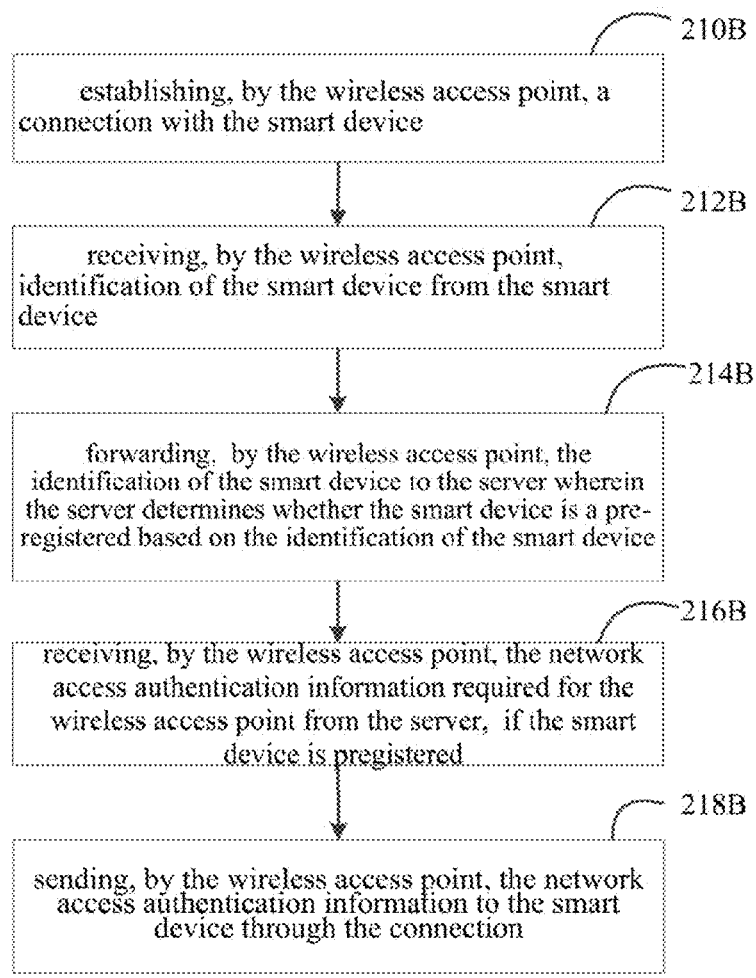
FIG. 2C is a flow chart of the method for network access according to another embodiment of the present disclosure.

FIG. 2C shows a flow chart of the method for network access according to another embodiment of the present disclosure. This embodiment is also illustratively described from the wireless access point in the environment as shown in FIG. 1 to which the method for network access is applied. In this embodiment, the method also includes the steps in FIG. 2A, and furthermore, the wireless access point 160 provides network access authentication information to the smart device 180 through the following steps:

step 210B, establishing, by the smart device, a connection with the wireless access point;

step 212B, receiving, by the wireless access point, identification of the smart device from the smart device;

step 214B, forwarding, by the wireless access point, the identification of the smart device to the server wherein the server determines whether the smart device is a pre-registered based on the identification of the smart device;

step 216B, receiving, by the wireless access point, the network access authentication information required for the wireless access point from the server, if the smart device is pre-registered;

step 218B, sending, by the wireless access point, the network access authentication information to the smart device through the connection.

In sum, according to the method for access network provided by the present embodiment, the access of the smart device 180 to the network is achieved by obtaining the identifications of the smart device 180 and wireless access point via the terminal 120 and then sending them to the server 140, and achieving the connection between the smart device 180 and wireless access point 160 via the server. Thus, the present disclosure can solve the problem relating to the limitation to the application of the methods for wireless network access and lack of feasibility and versatility and provide a simplified method for linking the smart device to network with enhanced feasibility and versatility.

Figure 3:
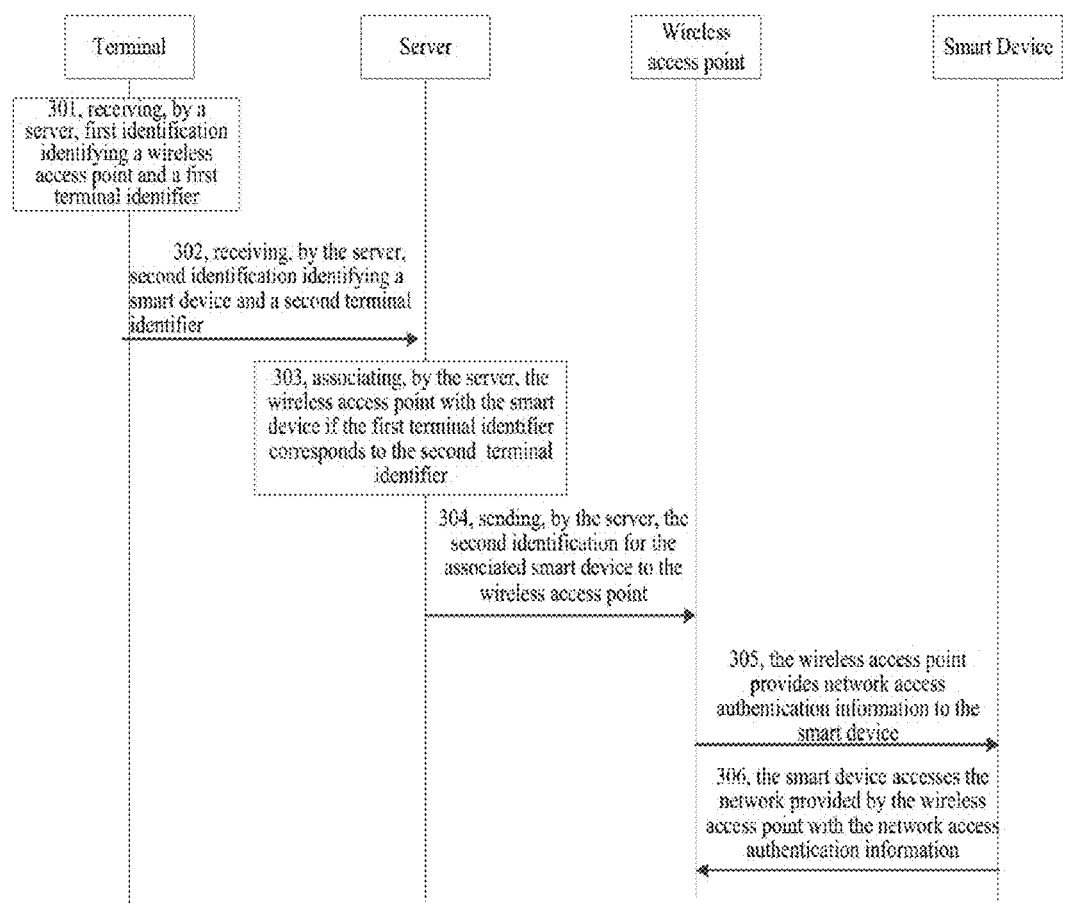
FIG. 3 is a flow chart of the method for network access according to another embodiment of the present disclosure.

FIG. 3 shows a flow chart of the method for network access according to another embodiment of the present disclosure. This embodiment is illustratively described in terms of applying the method for network access to the environment as shown in FIG. 1. The method for network access includes:

step 301, receiving, by a server comprising a processor and a non-transitory storage medium, a first identification identifying a wireless access point and a first terminal identifier;

Each wireless access point and each smart device have their own identification and the identification is the identifier for indicating the wireless access point and smart device, which may comprise information relating to device type and device ID and carried by a machine-readable code. The machine-readable codes include, but are not limited to, bar code, Universal Product Codes (UPC), quick response (QR) codes, Qode, MaxiCode, Data Matrix, PDF417, SPARQ-Code, words, NFC label or the like. The machine-readable code can either be a 2-dimensional code, a 3-dimensional code or a multi-dimensional code. A device type can be a random string, for example "tplink-tlwr2042n" and the device ID may also be a string such as "ed2c3sed2". The identification of wireless access point and smart device can be set by manufacturers and the identifications of any two devices are different from each other.

For the convenience of access of the smart device to the network provided by the wireless access point, the identifications of each smart device and each wireless access point, i.e. the machine-readable code, can be a label on the surface of the device, alternatively, it can also be printed on a paper or card to put into the package of the device, or can also be printed on the package, and so on. The terminal is provided with an application program for reading or obtaining the identifications of the wireless access point and smart device.

The terminal is connected to the server via wireless or wired network to transmit information. The first terminal identifier can identify the terminal that obtained the identification of the wireless access point. In some embodiment, the first terminal identifier can also identify a user account for the software program running in the terminal.

step 302, receiving, by the server, a second identification identifying a smart device and a second terminal identifier;

step 303, associating, by the server, the wireless access point with the smart device if the first terminal identifier corresponds to the second terminal identifier; The identifications of each wireless access point and each smart device may have been already registered in the server, that is to say, the server may restore the identifications of each wireless access point and each smart device. After the server receives the identifications of wireless access point and smart device sent from the terminal, in some embodiments, the server detects whether the identifications of wireless access point and smart device have been already registered or not, if registered, the identification of the wireless access point is associated, by the server, with the identification of the smart device.

step 304, sending, by the server, the second identification for the associated smart device to the wireless access point; wherein a certain process which can be connected and communicated with the server is installed on the wireless access point; after the server sends the associated identification of the smart device to the wireless access point, the wireless access point can determine the smart device which needs to connect with itself.

Correspondingly, the wireless access point receives the identification of the smart device sent from the server.

step 305, the wireless access point provides network access authentication information to the smart device; wherein the wireless access point directly or indirectly sends the network access authentication information, such as access password thereof, to the smart device through preset channel after determining the smart device connecting with it. In a direct way, the wireless access point sends the access password to the smart device by the wireless access point itself. In an indirect way, to the wireless access point sends the access password to the server and then the server forwards it to the smart device.

Correspondingly, the smart device receives the access password of the wireless access point that is directly or indirectly sent from the wireless access point through preset channel.

step 306, the smart device accesses the network provided by the wireless access point with the network access authentication information.

In some embodiments, each wireless access point may have two SSIDs (service set identifiers), assuming SSID1 and SSID2. For example, in some embodiment, SSID is known as wireless network channel. SSID1 may be a normal wireless network channel which can be encrypted. Any smart device accesses network via this normal SSID1 in the case that the access password is verified. In present example, SSID1 is referred as a network provide by wireless access point. In some embodiments, SSID2 can be a special wireless network channel without encrypting and is merely configured to obtain the access password of the wireless access point by the smart device. In the present example, SSID2 is referred as preset channel provided by wireless access point. The access password of the wireless access point is the password of SSID1. The smart device receives the access password and then links to SSID1, thereby accessing internet.

In sum, according to the method for access network provided by the present embodiment, the access of the smart device 180 to the network is achieved by obtaining the identifications of the smart device 180 and wireless access point via the terminal 120 and then sending them to the server 140, and achieving the connection between the smart device 180 and wireless access point 160 via the server. Thus, the present disclosure can solve the problem relating to the limitation to the application of the methods for wireless network access and lack of feasibility and versatility and provide a simplified method for linking the smart device to network with enhanced feasibility and versatility.

Figure 4:
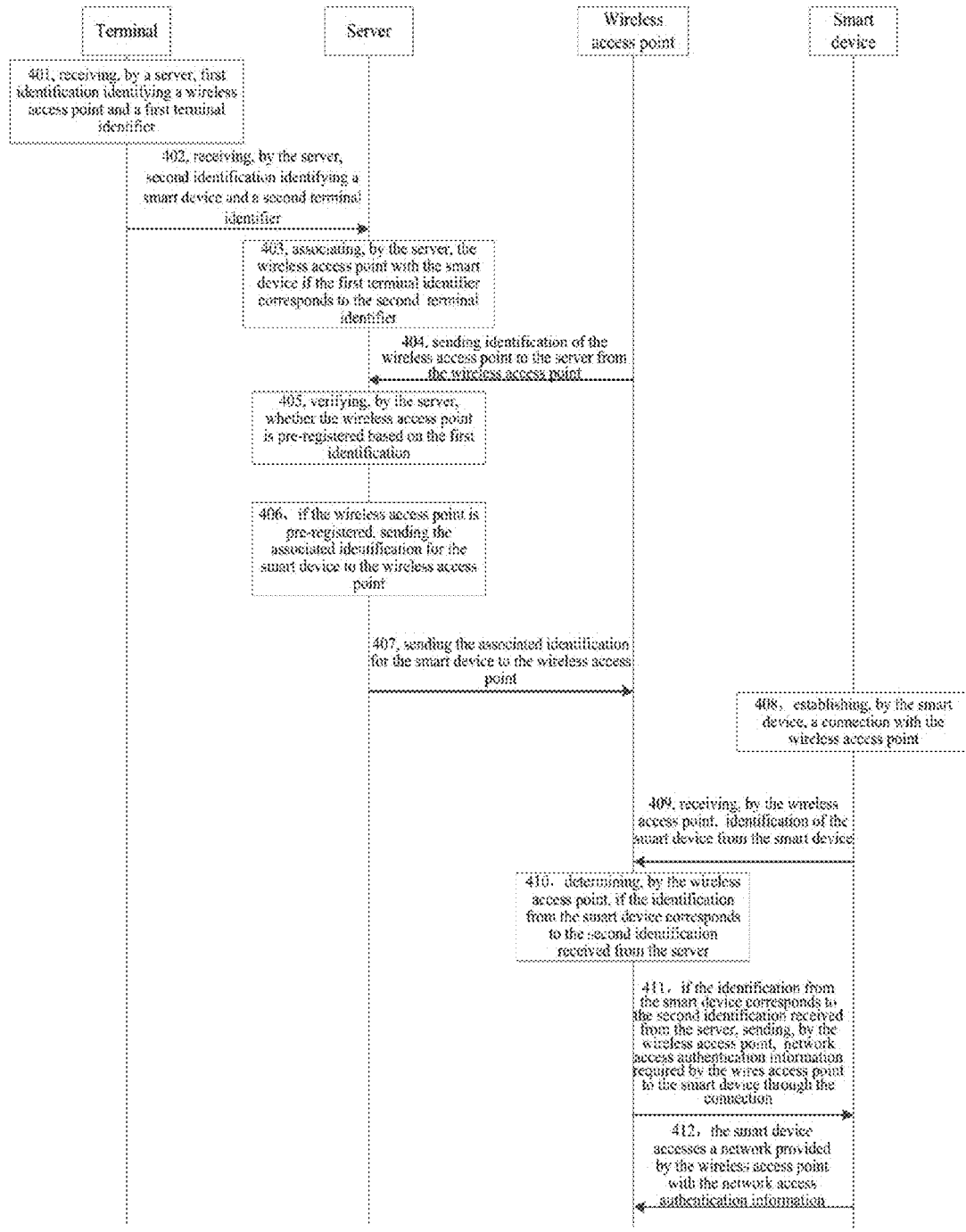
FIG. 4 is a flow chart of the method for network access according to another embodiment of the present disclosure.

FIG. 4 shows a flow chart of the method for network access according to another embodiment of the present disclosure. This embodiment is also illustratively described in terms of applying the method for network access to the environment as shown in FIG. 1. As an exemplary example based on the one shown in FIG. 3, the method for network access provided in the present embodiment includes:

step 401, receiving, by a server comprising a processor and a non-transitory storage medium, a first identification identifying a wireless access point and a first terminal identifier; For the convenience of access of the smart device to the network provided by the wireless access point, the identifications of each smart device and each wireless access point, i.e. the machine-readable code, can be a label on the surface of the device, alternatively, it can also be printed on a paper or card to put into the package of the device, or can also be printed on the package, and so on. The machine-readable codes include, but are not limited to, Universal Product Codes (UPC), quick response (QR) codes, Qode, MaxiCode, Data Matrix, PDF417, SPARQCode or the like. A machine-readable code can either be a 2-dimensional code, a 3-dimensional code or a multi-dimensional code. The terminal is provided with an application program for reading or obtaining the identifications of the wireless access point and smart device.

The terminal is connected to the server via wireless or wired network to transmit information. The first terminal identifier can identify the terminal that obtained the identification of the wireless access point. In some embodiment, the first terminal identifier can also identify a user account for the software program running in the terminal.

In some embodiments, this step may be divided into first implementation without associating and the second implementation with associating on the basis whether the terminal is pre-bound with wireless access point. In the first implementation, this step includes following two sub-steps:

firstly, obtaining the first identification provided by the wireless access point via first predetermined way at the first moment;

secondly, obtaining the second identification provided by the smart device via second predetermined way at the second moment, wherein the time period from the first moment to the second moment is less than the predetermined threshold value.

The terminal predetermines the threshold value between the second moment and the first moment. The obtaining, in some embodiments, by reading, is effective provided that the time period from the moment at which reading the first identification provided by the wireless access point to that at which obtaining the second identification provided by the smart device is less than the threshold value, otherwise the reading is regarded as ineffective or failure due to time out and the user needs to perform reading operation again. For example, under the condition that the preset minimal threshold value is 20 seconds, a certain user reads the first identification provided by the wireless access point at 9:30:00. If the user reads the second identification provided by the smart device within 9:30:20 (not including 9:30:20), the reading is effective. Otherwise, the reading is regarded as ineffective or failure due to time out.

In some embodiments, in the second implementation, this step may include following sub-steps:

obtaining the first identification provided by the wireless access point through the first predetermined way at the third moment;

obtaining the second identification provided by the smart device through the second predetermined way at the fourth moment.

In comparison with the first implementation, the time period from the moment at which reading the first identification provided by the wireless access point to that at which reading the second identification provided by the smart device is not defined in the second implementation. For example, a certain user reads the identification provided by wireless access point at 9:30:00, he/she could read identification provided by the smart device at any time such as at 10:30:00, even at 9:30:00 next day.

In the first and the second implementations, the first predetermined way includes: scanning the machine-readable code on the wireless access point, and/or communicating with wireless access point through wireless Near Field Communication technologies (NFC). In some embodiments, the second predetermined way may include: scanning the machine-readable code on the smart device, and/or communicating with smart device through wireless Near Field Communication technologies (NFC).

step 402, receiving, by the server, a second identification identifying a smart device and a second terminal identifier, wherein the terminal and the server can be connected through wireless or wired network to transmit information.

In some embodiments, corresponding to the first implementation in step 401, this step may include:

sending the first identifications of the wireless access point and the second smart device from the terminal to the server simultaneously.

When the time period from the moment at which obtaining the first identification provided by the wireless access point to that at which obtaining the second identification provided by the smart device is less than the predetermined threshold, the terminal effectively obtains the identifications provided by the wireless access point and smart device and then sends the identifications of the wireless access point and the smart device to the server simultaneously.

Correspondingly, the server simultaneously receives the identifications of the wireless access point and smart device sent from the terminal.

Wherein the first identification of the wireless access point is obtained from the wireless access point by the terminal through the first predetermined way at the first moment, and the second identification of the smart device is obtained from the smart device by the terminal through the second predetermined way at the second moment.

In some embodiments, corresponding to the second implementation in step 401, this step may include following two sub-steps:

firstly, sending the first identification of the wireless access point and a first terminal identifier of the terminal from the terminal to the server;

In some embodiments, the terminal identifier is configured to distinguish various terminal users in the terminal, and one terminal may contain a number of terminal users but the identifiers can be varied depending on various terminal users, the identifier is typically a string.

Correspondingly, the server receives the first identification of the wireless access point and the first terminal identifier of the terminal sent from the terminal, and generates the binding relationship between the identification of the wireless access point and the terminal identifier of the terminal from the server, wherein the first identification of the wireless access point is obtained from the wireless access point through the first predetermined way by the terminal at the third moment.

secondly, sending the second identification of the smart device and the second terminal identifier of the terminal from the terminal to the server;

Correspondingly, the server receives the second identification of the smart device and the second terminal identifier of the terminal sent from the terminal, wherein the identification of the smart device is obtained from the smart device through the second predetermined way by the terminal at the fourth moment. In this implementation, even though the interval between the time points for performing the aforesaid two sub-steps is long, the present step is effective due to pre-binding of the terminal and the wireless access point. As mentioned in step 401, even if the interval between the two time points is one day or even longer, the implementation can also be performed.

step 403, associating, by the server, the wireless access point with the smart device if the first terminal identifier corresponds to the second terminal identifier. In some embodiments, the identifications of each wireless access point and each smart device may have been already registered in the server, that is to say, the server saved the identifications of each wireless access point and each smart device. In some embodiments, after the server receives the identifications of wireless access point and smart device sent from the terminal, the server detects whether the identifications of wireless access point and smart device have been already registered or not, if registered, the identification of the wireless access point is associated with the identification of the smart device.

In some embodiments, corresponding to the first implementation in step 401, the server may directly associate the identification of the wireless access point with the one of the smart device because the server receives the identifications of the wireless access point and the smart device simultaneously sent from the terminal.

In some embodiments, corresponding to the second embodiment in step 401, the server initially receives the identification of the wireless access point and the identifier of the terminal sent from the terminal and generates the binding relationship between the identification of the wireless access point and the identifier of the terminal. Thereafter the server receives the identification of the smart device and the identifier of the terminal sent from the terminal. The server finds the identification of the wireless access point bound with terminal according to the identifier of the terminal and the binding relationship, and then associates the found identification of the wireless access point with the one of the smart device.

It is appreciated that the correlation, i.e. association, is merely used by server to determine which smart device and which wireless access point are connected together, but cannot indicate that the smart device is connected with the wireless access point via wireless or wired network.

step 404, sending identification of the wireless access point to the server from the wireless access point;

In some embodiments, for the reason of security, the server needs to verify the identification of the wireless access point before sending the associated identification of the smart device to the wireless access point. The identity of the wireless access point may be verified by checking the identification of the wireless access point by the server. The wireless access point is provided with a certain process which can be connected to the server and communicated with the server. The wireless access point sends its identification to the server.

Correspondingly, the server receives the identification of the wireless access point sent from the wireless access point.

step 405, verifying, by the server, whether the wireless access point is pre-registered based on the first identification;

In some embodiments, each wireless access point may be pre-registered in the server. For example, the server may pre-store the identification of each wireless access point. The server verifies the identification of the wireless access point by detecting whether the identification of the wireless access point has been registered and saved in the server.

step 406, if the wireless access point is pre-registered, sending the associated identification for the smart device to the wireless access point;

If the detection result is that the wireless access point was pre-registered, the authentication of the wireless access point performed by the server is successful and the server informs the wireless access point of the identification of the smart device.

It is appreciated that steps 404 to 406 are often performed after steps 401 to 403. However, steps 404 to 406 could be performed with steps 401 to 403 simultaneously. Steps 404 to 406 can also be performed before steps 401 to 403. The present embodiment illustratively describe the condition that steps 404 to 406 are performed after steps 401 to 403, but not limited to this.

step 407, sending the associated identification for the smart device to the wireless access point;

In some embodiments, after the server sends the associated identification of the smart device to the wireless access point, the wireless access point may determine the smart device which needs to connect with itself.

Accordingly, the wireless access point receives the identification of the smart device sent from the server.

step 408, establishing, by the smart device, a connection with the wireless access point.

In some embodiments, this step includes following two sub-steps:

firstly, obtaining the gateway address of the wireless access point through preset channel by using the predetermined way by the smart device;

In some embodiments, the smart device also needs to know the gateway address of the wireless access point to connect with the wireless access point when it scans and obtains the preset channel such as SSID2 in the wireless access point. Meanwhile, the smart device needs to obtain the gateway address of the wireless access point via a predetermined way which includes:

obtaining through running the interface of underlying application of the smart device;

in some embodiments, the interface of the underlying application can be API (Application Programming Interface), which is predefined functions and provides the capability of visiting a set of routine with the application or developer, without visiting source code or understanding the details of the internal mechanism, and wherein the chip of the smart device will carry corresponding SDK (Software Development Kit), some of which possess such functional API.

or obtaining through parsing the host name of the wireless access point by a domain name server;

in some embodiments, the IP (Internet Protocol) address obtained through parsing IP address of the host name of the wireless access point by a domain name server is the gateway address of the wireless access point;

or obtaining through broadcast user datagram protocol UDP packet; in some embodiments, the gateway address of the wireless access point can be obtained from the returned packet which is received from the gateway of the wireless access point through sending the broadcast UDP.

Secondly, connecting the smart device with the wireless access point according to the gateway address of the wireless access point;

In some embodiments, each wireless access point may have two SSIDs (service set identifiers), assuming SSID1 and SSID2. Exemplary, SSID is known as wireless network channel. SSID1 can be a normal wireless network channel which may be encrypted. Any smart device links to network via this normal SSID1 in the case that the access password is verified. In some embodiments, SSID1 is referred as a network provided by wireless access point. SSID2 can be a special wireless network channel without being encrypted and is merely configured to obtain the access password of the wireless access point. In the present embodiments, SSID2 is referred as a preset channel provided by wireless access point. The access password of the wireless access point is the password of SSID1. The smart device receives the access password and then links to SSID1, thereby linking to network.

In the present embodiment, the smart device is connected with the wireless access point via SSID2 which refers to preset channel provided by wireless access point after obtaining the gateway address of the wireless access point.

step 409, receiving, by the wireless access point, identification of the smart device from the smart device; in some embodiments, the wireless access point can verify the identification of the smart device before sending the access password to the smart device that may make wireless access point confirm its own identity through the identification of the smart device itself.

It is appreciated that steps 408 and 409 are often performed with step 407 simultaneously, but steps 408 and 409 may be performed before step 407. Steps 408 and 409 may also be performed after step 407. The present example merely describes the condition that steps 408 and 409 are performed after step 407, but not limited to this.

step 410, determining, by the wireless access point, if the identification from the smart device corresponds to the second identification received from the server, in some embodiments, the wireless access point can verify the identity of the smart device through comparing the identification of the smart device received through the preset channel and the identification of the smart device received from the server.

In some embodiments, in the various examples, the verification performed in this step may be more complicated. Additionally, considering the security, the information transfer among the smart device, wireless access point and the server will encrypt some information before sending.

step 411, if the identification from the smart device corresponds to the second identification received from the server, sending, by the wireless access point, network access authentication information required by the wires access point to the smart device through the connection, in some embodiments, the wireless access point sends its access password to the smart device through the preset channel after the verification for the identity of the intelligent performed by the wireless access point device is successful.

Correspondingly, the smart device receives the access password of the wireless access point sent from the wireless access point through the preset channel.

step 412, the smart device accesses a network provided by the wireless access point with the network access authentication information.

In some embodiments, the network provided by the wireless network point may be SSID1 that is a normal wireless network name and the network may be encrypted. Any smart device links to network via this normal SSID1 in the case that the access password is verified. After receiving the access password, the smart device is connected with SSID1 to link to the network.

It is appreciated that considering the security of information transfer among the smart device, wireless access point and server, the key may be pre-saved in the server by the smart device and wireless access point and the information to be sent can be encrypted via the key. The encryption method may be AES (Advanced Encryption Standard) symmetric encryption or other encryption.

It is also appreciated that considering the security and conciseness of information transfer among the smart device, wireless access point and server, the information to be delivered can be message-digested before sending. Message-digest algorithm may be md5 (Message-Digest Algorithm 5), or other digest algorithms such as md4, md3 or md2.

In sum, according to the method for access network provided by the present embodiment, the access of the smart device 180 to the network is achieved by obtaining the identifications of the smart device 180 and wireless access point via the terminal 120 and then sending them to the server 140, and achieving the connection between the smart device 180 and wireless access point 160 via the server. Thus, the present disclosure can solve the problem relating to the limitation to the application of the methods for wireless network access and lack of feasibility and versatility and provide a simplified method for linking the smart device to network with enhanced feasibility and versatility.

Meanwhile, as an exemplary embodiment over the one as shown in FIG. 3, the method for network access provided by the present embodiment provides two different methods for reading the identifications of the wireless access point and smart device from terminal side, which improves the feasibility of the method for network access provided by the present embodiment. Furthermore, the verification to the identity of the wireless access point is performed by the server before delivery of information between the server and the wireless access point so that the security of the method for network access is enhanced. Furthermore, the security and conciseness of the information transfer among the smart device, wireless access point and server may be improved through encrypting and message-digesting information before sending.

Figure 5A:
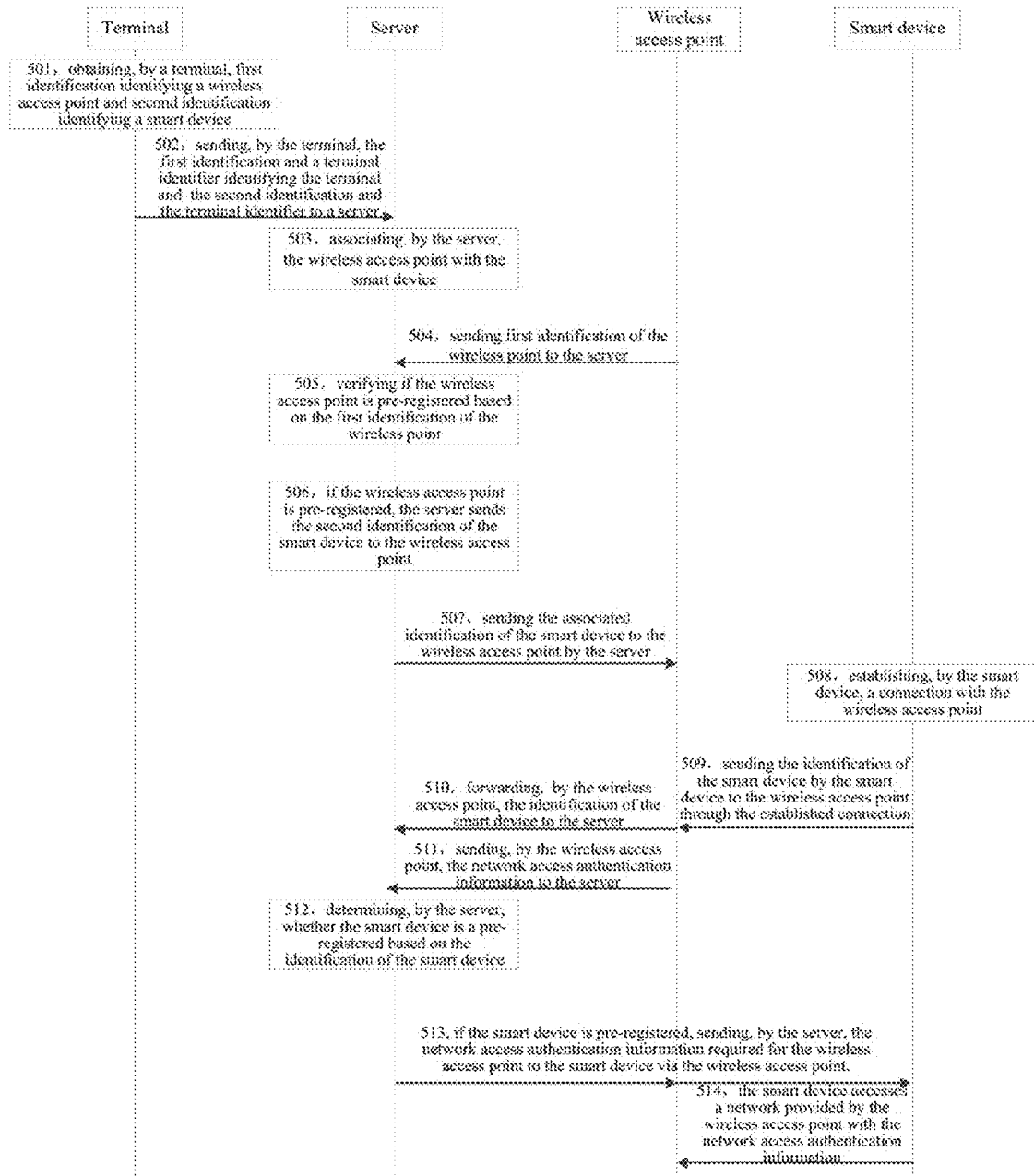
FIG. 5A is a flow chart of the method for network access according to another embodiment of the present disclosure.

FIG. 5A shows a flow chart of the method for network access according to another embodiment of the present disclosure. This embodiment is also illustratively described in terms of applying the method for network access to the environment as shown in FIG. 1. As more preferable embodiment based on those shown in FIGS. 3 and 4, the method for network access provided in the present embodiment includes:

step 501, obtaining, by a terminal, first identification identifying a wireless access point and second identification identifying a smart device; wherein each wireless access point and each smart device have their own identifications and the identification is the identifier for indicating the wireless access point or smart device, which typically contains information relating to device type and device ID and may be shown as any machine-readable code, including, but not limited to barcode, Maxicode, words or NFC label and the like; wherein the device type is typically a string such as tplink-tlwr2042n and the device ID is also a string such as ed2c3sed2. The identifications of wireless access point and smart device are set by the manufacturers and the identifications of any two devices are different from each other.

For the convenience of the access of the smart device to the network provided by the wireless access point, the identifications of each smart device and each wireless access point can be formed as a label to paste on the surface of the device or can be printed on a paper or card to put into the package of the device, or can be printed on the package, and so on. The terminal is equipped with application program for reading or identifying the identifications of the wireless access point and smart device.

The two implementations can be configured to perform this step, which are described in detail in the embodiment as shown in FIG. 4 and will be omitted herein.

step 502, sending, by the terminal, the first identification and a terminal identifier identifying the terminal and the second identification and the terminal identifier to a server, wherein the server can be connected with the terminal via wireless and wired network to transmit information.

In some embodiments, corresponding to two implementations of step 501, two implementations of this step are also described in the embodiment as shown in FIG. 4, which are omitted herein.

step 503, associating, by the server, the wireless access point with the smart device; in some embodiments, the identifications of each wireless access point and each smart device may have been already registered in the server, that is to say, the server stores the identifications of each wireless access point and each smart device; upon the server receives the identifications of wireless access point and smart device sent from the server, preferably, the server detects whether the identifications of wireless access point and smart device have been already registered or not, if registered, the identification of the wireless access point is associated with the identification of the smart device.

In some embodiments, corresponding to two implementations of step 501, two implementations of this step are also described in the embodiment as shown in FIG. 4, which is omitted herein.

It is appreciated that the correlation is configured to determine the smart device and the wireless access point which need to be connected with each other, but it doesn't mean the wireless access point is already connected with the smart device via the wireless or wired network.

step 504, sending first identification of the wireless point to the server.

In some embodiments, for security concern, the server may need to verify the identifier to the wireless access point before sending the associated identification of the smart device to the wireless access point. The server may verify the identity of the wireless access point via the identification of the wireless access point. The wireless access point is provided with a certain process which can be connected to the server and communicated with the server. The wireless access point sends the identification thereof to the server.

step 505, verifying if the wireless access point is pre-registered based on the first identification of the wireless point;

In some embodiments, each wireless access point may be pre-registered in the server. The server may store the identification of each wireless access point. The server can verify the identity of the wireless access point by detecting whether the identification of the wireless access point has been registered and saved.

step 506, if the wireless access point is pre-registered, the server sends the second identification of the smart device to the wireless access point;

If the detection result is that the wireless access point was pre-registered, the verification performed by the server to the identity of the wireless access point is successful, and the wireless access point is informed of the identification of the smart device by the server.

It is appreciated that steps 504 to 506 are often performed after steps 501 to 503. However, steps 504 to 506 could be performed with steps 501 to 503 simultaneously. Steps 504 to 506 can also be performed before steps 501 to 503. The present embodiment illustratively describe the condition that steps 504 to 506 are performed after steps 501 to 503, but not limited to this.

step 507, sending the associated identification of the smart device to the wireless access point by the server.

The wireless access point may determine the smart device which needs to connect with itself after the server sends the associated identifier of the smart device to the wireless access point.

step 508, establishing, by the smart device, a connection with the wireless access point.

In some embodiments, this step may include following two sub-steps:

firstly, obtaining the gateway address of the wireless access point through preset channel by using the predetermined way by the smart device;

wherein, in some embodiments, the predetermined way includes:

running an application programming interface of the smart device, wherein the interface of the underlying application is API (Application Programming Interface), which is predefined functions and provides the capability of visiting a set of routine with the application or developer, without visiting source code or understanding the details of the internal mechanism, and wherein the chip of the smart device itself will carry corresponding SDK (Software Development Kit), some of which possess such functional API;

alternatively, obtaining through parsing the host name by the domain name server, wherein the IP (Internet Protocol) address obtained through parsing IP address of the host name of the wireless access point by the domain name server is the gateway address of the wireless access point.

Alternatively, obtaining through broadcast user datagram protocol UDP packet, wherein the gateway address of the wireless access point can be obtained from the returned packet which is received from the gateway of the wireless access point through sending the broadcast UDP.

Secondly, connecting the smart device with the wireless access point according to the gateway address of the wireless access point;

in some embodiments, each wireless access point may have two SSIDs (service set identifiers), assuming SSID1 and SSID2. Exemplary, SSID is known as wireless network channel. SSID1 can be a normal wireless network channel which may be encrypted. Any smart device links to network via this normal SSID1 in the case that the access password is verified. In some embodiments, SSID1 is referred as a network provided by wireless access point. SSID2 can be a special wireless network channel without being encrypted and is merely configured to obtain the access password of the wireless access point. In the present embodiments, SSID2 is referred as a preset channel provided by wireless access point. The access password of the wireless access point is the password of SSID1. The smart device receives the access password and then links to SSID1, thereby linking to network.

In the present embodiment, the smart device is connected with the wireless access point through SSID2 referred as preset channel provided by wireless access point after obtaining the gateway address of the wireless access point.

step 509, sending the identification of the smart device by the smart device to the wireless access point through the established connection;

wherein the wireless access point verifies the identification of the smart device via the server before sending the access password to the smart device that may allow the wireless access point confirm its identity through its own identification.

It is appreciated that steps 508 and 509 are often performed with step 507 simultaneously, but steps 508 and 509 may be performed before step 507. Steps 508 and 509 may be performed after step 507. The present example merely describes the condition that steps 508 and 509 are performed after step 507, but not limited to this.

step 510, forwarding, by the wireless access point, the identification of the smart device to the server, wherein the identity of the smart device can be verified by the wireless access point via the server.

step 511, sending, by the wireless access point, the network access authentication information to the server; wherein the server verifies the identity of the smart device before sending the access password of the wireless access point to the smart device. In exemplary embodiment, the access password of the wireless access point can be encrypted by the server by encryption predetermined with the smart device before sending to the smart device.

It is appreciated that step 511 is often performed with step 510 simultaneously, but step 511 can also be performed before step 510. Step 511 can also be performed after step 510. The present embodiment merely describes the condition that steps 511 is performed after step 510, but not limited to this.

step 512, determining, by the server, whether the smart device is a preregistered based on the identification of the smart device.

Figure 5B:
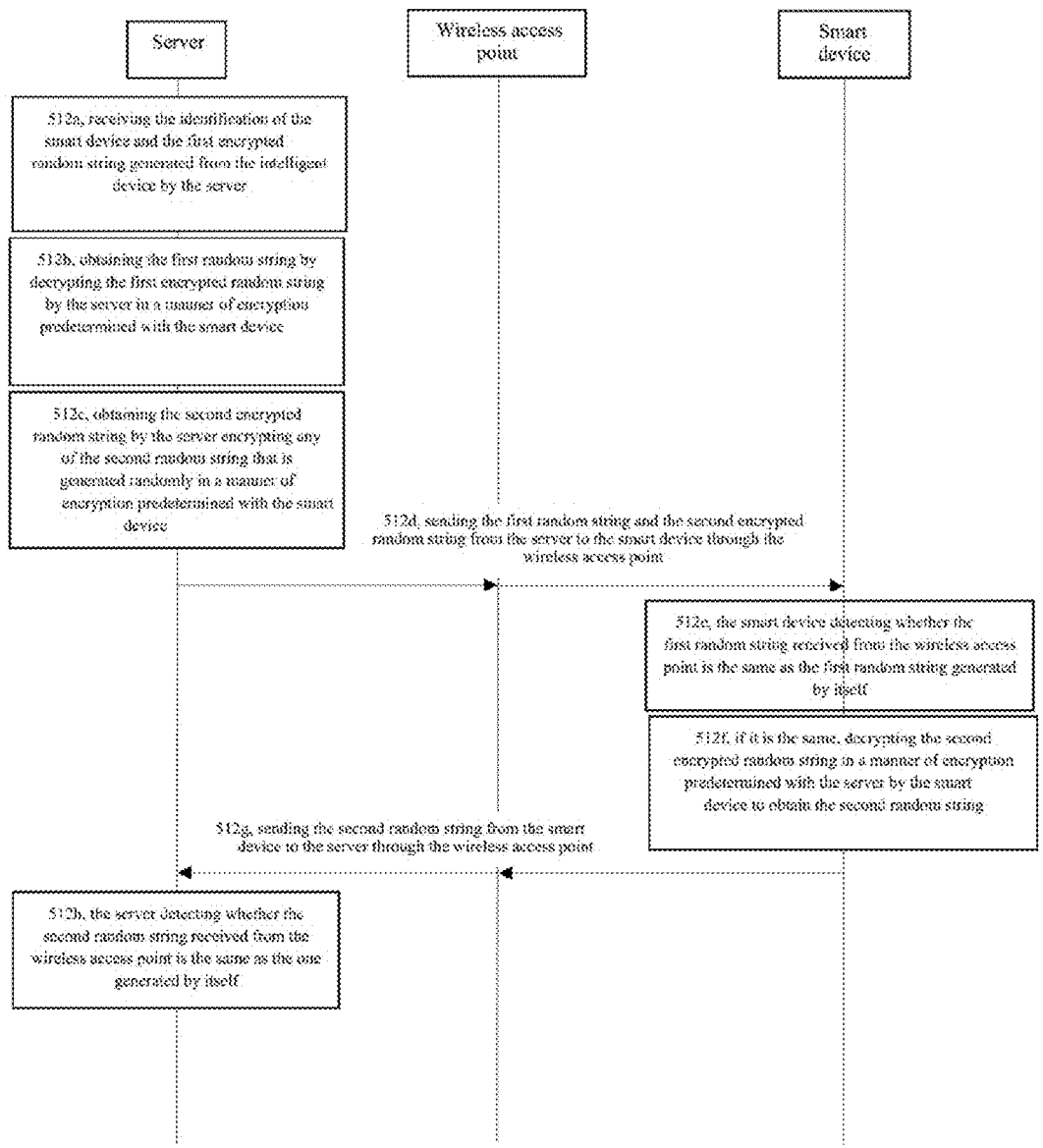
FIG. 5B is a part flow chart of the method for network access according to the embodiment as shown in FIG. 5A.

FIG. 5B shows a flow chart of the method for verifying whether the smart device is pre-registered according to the identification of the smart device by the server. In some embodiments, the present step may include following several sub-steps:

step 512a, receiving the identification of the smart device and the first encrypted random string generated from the intelligent device by the server; wherein the first encrypted random string is obtained by the smart device encrypting any of the first random string that is generated randomly in a manner of encryption predetermined with the server.

step 512b, obtaining the first random string by decrypting the first encrypted random string by the server in a manner of encryption predetermined with the smart device;

step 512c, obtaining the second encrypted random string by the server encrypting any of the second random string that is generated randomly in a manner of encryption predetermined with the smart device.

step 512d, sending the first random string and the second encrypted random string from the server to the smart device through the wireless access point.

step 512e, the smart device detecting whether the first random string received from the wireless access point is the same as the first random string generated by itself;

step 512f, if it is the same, decrypting the second encrypted random string in a manner of encryption predetermined with the server by the smart device to obtain the second random string;

step 512g, sending the second random string from the smart device to the server through the wireless access point.

step 512h, the server detecting whether the second random string received from the wireless access point is the same as the one generated by itself; wherein, if it is the same, the smart device is pre-registered, thereby sending the access password of the wireless access point from the server to the smart device.

It is appreciated that considering the security and the simplicity of information transfer among the smart device, wireless access point and server, the information transmitting between any two of the smart device, wireless access point and server may be encrypted and message-digested. The encryption method may be AES (Advanced Encryption Standard) symmetric encryption algorithms or other encryption. Message-digest algorithms may be md5 (Message-Digest Algorithm 5), or other digest algorithms such as md4, md3 or md2. For example, the first random string "random1" can be decrypted by the server and then subjected to md5 processing, thereby obtaining md5 of "random1". And md5 of "random1" is encrypted in a manner of AES encryption to obtain AES for md5 of "random1". Similarly, the second random string "random2" is decrypted by the smart device and then subjected to md5 processing, thereby obtaining md5 of "random2". And md5 of "random2" is encrypted in a manner of AES encryption to obtain AES for md5 of "random2".

step 513, if the smart device is pre-registered, sending, by the server, the network access authentication information required for the wireless access point to the smart device via the wireless access point; wherein the access password of the wireless access point can be initially sent to the wireless access point by the server and then forwarded to the smart device through the preset channel by the wireless access point.

Accordingly, the smart device receives the access password of the wireless access point sent from the wireless access point through the preset channel.

step 514, the smart device accesses a network provided by the wireless access point with the network access authentication information.

In the embodiment, the network provided by the wireless access point is known as SSID1, which is a normal network name with encrypting. Any smart device is linked to the network by using this normal SSID1 with verified password. The smart device obtains the access password and then links to SSID1, thereby linking to network.

It is appreciated that considering the security of information transfer among the smart device, wireless access point and server, the respective key may be pre-saved in the server by the smart device and wireless access point and the information to be sent can be encrypted via the key pair. The method for encryption may be AES (Advanced Encryption Standard) symmetric encryption or other encryption.

It is also appreciated that considering the security and conciseness of the delivery of information among the smart device, wireless access point and server, the information to be delivered can be message-digested before sending. Message-digest algorithms may be md5 (Message-Digest Algorithm 5), or other digest algorithms such as md4, md3 or md2.

In sum, according to the method for access network provided by the present embodiment, the access of the smart device 180 to the network is achieved by obtaining the identifications of the smart device 180 and wireless access point via the terminal 120 and then sending them to the server 140, and achieving the connection between the smart device 180 and wireless access point 160 via the server. Thus, the present disclosure can solve the problem relating to the limitation to the application of the methods for wireless network access and lack of feasibility and versatility and provide a simplified method for linking the smart device to network with enhanced feasibility and versatility.

Meanwhile, as the more preferable embodiment over the ones as shown in FIGS. 3 and 4, the method for network access provided by the present embodiment provides two different method for reading the identifications of the wireless access point and smart device at terminal side, which improves the feasibility of the method for network access provided by the present embodiment. Furthermore, the server verifies the identity of the wireless access point before delivery of information between the server and the wireless access point such that the security of the method for network access is enhanced. Furthermore, the information transfer among the smart device, wireless access point and server can be encrypted and the information can be message-digested before sending, thereby improving the security and conciseness of the information transfer.

To illustrate more specifically, for example, User 1 turns on the cell phone provided with WeChat application program and then scans the machine-readable codes of a router and a intelligent light printed on the device packages in sequence within the prescribed threshold value. The machine-readable code of the router carries the identification of the router. Similarly, the two-machine-readable of the light carries the identification of the light. User 1 sends the identifications of the router and the intelligent light to the WeChat server by using cell phone simultaneously. After verifying that the two identifications are registered in the WeChat server side, the identification of the intelligent light is sent to the router. Meanwhile, the intelligent light after obtaining gateway address of the router through SSID2 of the router sends its own identification to the router. After successfully verifying the identifications received from the WeChat server by the server and the intelligent light, the router sends the access password to the intelligent light. After receiving the access password, the intelligent light accesses the wireless network provided by the router through SSID1 according to the access password. User 1 only needs to scan the machine-readable codes of router and intelligent light to achieve the wireless network access of intelligent light.

In another specific example, for example, User 2 initiates the intelligent family function added in the WeChat program with interface for scanning machine-readable code after turning on the cell phone provided with the WeChat application program. User 2 scans the machine-readable code of the router in the router's package following the instructions. After scanning, the interface of "My Family" is present. The WeChat account registered in WeChat program by User 2 and the identification of the router are sent to the WeChat server, and then the WeChat server saves the User 2's WeChat account and the identification of the router and binds both of them together. After a period of time, User 2 bought an intelligent TV. She initiates the WeChat application program and then enters into the interface of "My Family" and selects to add device, such that the interface for scanning machine-readable code is present. User 2 scans the machine-readable code of the intelligent TV printed on the label which located on the housing of the TV following the instructions. After scanning, the intelligent TV could be linked to the wireless network provided by the router. In other words, after scanning the machine-readable code of the intelligent TV, User 2's WeChat account registered in the WeChat application program and the identification of the intelligent TV are sent to the WeChat server by the WeChat application program. The WeChat server reads the identification of the router from the binding relationship between pre-registered User 2's account and the identification of the router according to User 2's WeChat account and then associates the router with the intelligent TV. The WeChat server sends the access password of the router to the intelligent TV after successfully verifying the identity of the router and intelligent TV. The intelligent TV accesses the wireless network according to the access password of the router. Further, if User 2 would like to add other smart device such as intelligent light, she merely needs to initiate WeChat application program and enters into interface of "My Family" and then select to add device. The intelligent light could obtain the access password and link to wireless network similar to the aforesaid method for adding the intelligent TV.

The following embodiments refer to the apparatus and can be configured to carry out the method embodiments. The details that are not disclosed below refer to the method embodiments.

Figure 6:
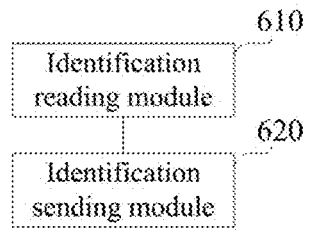
FIG. 6 is a block diagram of the apparatus for network access according to one embodiment of the present invention.

FIG. 6 shows a block diagram of the apparatus for network access according to one embodiment of the present invention. The apparatus for network access can be implemented as a terminal or part of terminal by using software, hardware or the combination thereof. The apparatus for network access includes: an identification reading module 610 and identification sending module 620.

The identification reading module 610 is configured to read the identification provided by a wireless access point and the identification provided by a smart device.

The identification sending module 620 is configured to send the identifications of the wireless access point and smart device read by the identification reading module 610 to a server, such that the server associates the identification of the wireless access point and the one of the smart device and then sends the associated identification of the smart device to the wireless access point. Wherein, the wireless access point directly or indirectly sends the access password of the wireless access point to the smart device by using preset channel according to the identification of the smart device. The smart device accesses the network provided by the wireless access point according to the access password.

Figure 7:
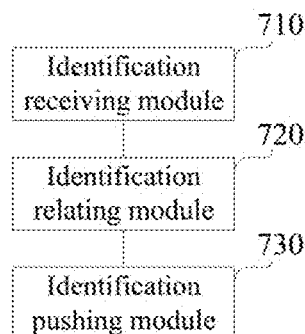
FIG. 7 is a block diagram of a server apparatus for network access according to another embodiment of the present disclosure.

FIG. 7 shows a block diagram of a server apparatus for network access according to another embodiment of the present disclosure. The server apparatus for network access can be implemented as a server or part of server by using software, hardware or the combination thereof. In some embodiments, the server apparatus for network access includes: an identification receiving module 710, an identification correlating module 720 and an identification pushing module 730.

The identification receiving module 710 is configured to receive, from a first terminal, a first identification identifying a wireless access point associated with a first terminal identifier identifying the first terminal, and receive, from a second terminal, a second identification identifying a smart device associated with a second terminal identifier identifying a second terminal.

The identification relating module 720 is to associate the wireless access point with the smart device if the first terminal identifier corresponds to the second terminal identifier.

The identification pushing module 730 is configured to send the second identification for the associated smart device to the wireless access point, wherein the wireless access point provides network access authentication information thereof to the smart device and the smart device accesses a network provided by the wireless access point with the network access authentication information. In some embodiments, the identification pushing module 730 sends the associated identification of the smart device by the identifier correlating module 720 to the wireless access point such that the access password of the wireless access point can be directly or indirectly sent from the wireless access point to the smart device through preset channel according to the identification of the smart device. The smart device is linked to the network provided by the wireless access point according to the access password.

Figure 8:
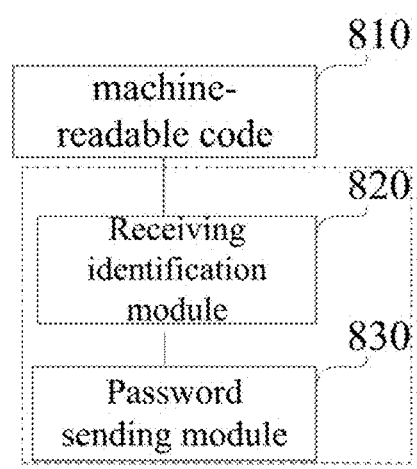
FIG. 8 is a block diagram of a wireless access point apparatus for network access according to another embodiment of the present disclosure.

FIG. 8 shows a block diagram of a wireless access point apparatus for network access according to another embodiment of the present disclosure. The wireless access point apparatus for network access can be a wireless access point or a part thereof by using software, hardware or the combination thereof. The wireless access point apparatus for network access comprises a machine-readable code 810 configured to provide first identification information of the wireless access point apparatus, a processor and a non-transitory storage medium accessible to the processor, wherein the non-transitory storage medium is configured to store modules comprising: a receiving identification module 820 and a password sending module 830.

In some embodiments, the machine-readable code module 810 is configured to provide the first identification of the wireless access point with a terminal, which is sent to the server after obtained by the terminal. The server associates the identification of the wireless access point and the identification of the smart device also sent from the terminal.

The receiving identification module 820 is configured to receive second identification of the smart device from a server after a server associates the first identification of the wireless access point apparatus with the second identification of the smart device.

The password sending module 830 is configured to provide network access authentication information required by the wireless access point apparatus to the smart device according to the second identification of the smart device. In some embodiments, the password sending module 830 directly or indirectly sends the access password of the wireless access point to the smart device according to the identification of the smart device received by the receiving identification module 820, such that the smart device is linked to the network provided by the wireless access point according to the access password.

In sum, the apparatus for network access of the present embodiment achieves the access of the smart device to the network by reading and identifying the identifications of the smart device and wireless access point via the terminal and then sending them to the server, and achieving the connection between the smart device and the wireless access point through the server. Therefore, the problem relating to the limitation to the application of the current methods for wireless network access and lack of feasibility and versatility is solved and the method for linking the smart device to network is simplified, and further feasibility and versatility are enhanced.

Figure 9:
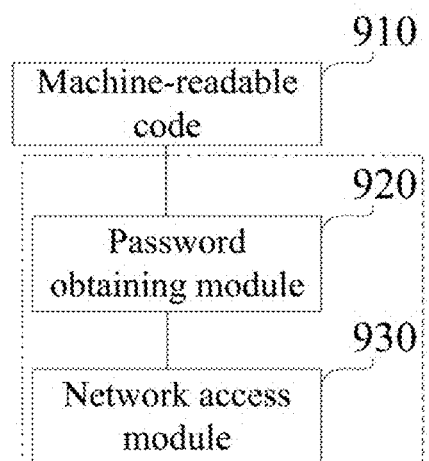
FIG. 9 is a block diagram of a smart device for network access according to another embodiment of the present disclosure.

FIG. 9 shows a block diagram of a smart device apparatus for network access according to another embodiment of the present disclosure. The apparatus for network access can be implemented as a smart device or a part thereof by using software, hardware or the combination thereof. The apparatus for network access comprises a machine-readable code 910 configured to provide identification of the smart device to a terminal, wherein the terminal sends the identification to a server which associates the smart device with a wireless access point, a processor and a non-transitory storage medium accessible to the processor, wherein the non-transitory storage medium is configured to store modules comprising: a password obtaining module 920 and a network access module 930.

In some embodiments, the machine-readable code 910 is configured to provide the identification of the smart device with a terminal, which is sent to the server after read by the terminal. The server associates the identification of the smart device and the identification of the wireless access point also sent from the terminal.

The password obtaining module 920 is configured to receive network access authentication information of the wireless access point. In some embodiments, the password obtaining module 920 receives the access password of the wireless access point that is directly or indirectly sent from the wireless access point through preset channel.

The network access module 930 is configured to access a network with the received network access authentication information. In some embodiments, it accesses the network provided by the wireless access point according to the access password obtained by the password obtaining module 920.

Figure 10:
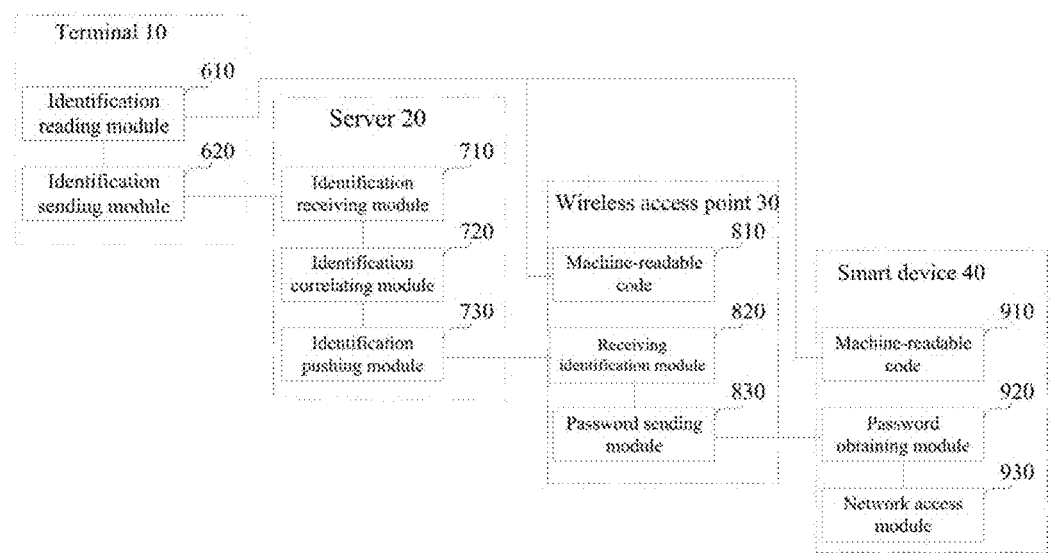
FIG. 10 is a block diagram of a system for network access according to one embodiment of the present disclosure.

FIG. 10 shows a block diagram of the system for network access according to one embodiment of the present disclosure. The present embodiment is illustratively described by applying the system for network access to the environment as shown in FIG. 1. In some embodiments, the system for network access includes: a terminal 10, a server 20, a wireless access point 30 and a smart device 40.

In some embodiments, the terminal 10 may include the identification reading module 610 and identification sending module 620.

The identification reading module 610 is configured to read identifications provided by the wireless access point and smart device.

The identification sending module 620 is configured to send the identifications of the wireless access point and smart device read by the identification reading module 610 to the server, such that the server associates the identification of the wireless access point and the one of the smart device and sends the associated identification of the smart device to the wireless access point. The access password of the wireless access point is directly or indirectly sent from the wireless access point to the smart device through preset channel according to the identification of the smart device. The smart device accesses the network provided by the wireless access point according to the access password.

In some embodiments, the server 20 may include the identification receiving module 710, identification correlating module 720 and identification sending module 730.

The identification receiving module 710 is configured to receive the identifications of the wireless access point and smart device, which are sent by the terminal after read from the wireless access point and smart device respectively.

The identification correlating module 720 is configured to associate the identification of the wireless access point and the one of the smart device received by the identification receiving module 710.

The identification pushing module 730 is configured to send the identification of the smart device associated by identification correlating module 720 to the wireless access point, such that the access password of the wireless access point is directly or indirectly sent from the wireless access point to the smart device through preset channel according to the identification of the smart device. The smart device is linked to the network provided by the wireless access point according to the access password.

In some embodiments, the wireless access point 30 may include: a machine-readable code 810, receiving identification module 820 and password sending module 830.

In some embodiments, the machine-readable code 810 is configured to provide the identification of the wireless access point with the terminal, which is sent to the server after read by the terminal. The server associates the identification of the wireless access point and the one of the smart device also sent from the terminal.

The receiving identification module 820 is configured to receive the identification of the smart device sent from the server, which is sent after correlating the identification of the wireless access point and the one of the smart device by the server.

The password sending module 830 is configured to directly or indirectly sent the access password of the wireless access point to the smart device through preset channel according to the identification of the smart device received by the receiving identification module 820, such that the smart device is linked to the network provided by the wireless access point according to the access password.

In some embodiments, the smart device 40 includes: the machine-readable code 910, password obtaining module 920 and network access module 930.

The machine-readable code 910 is configured to provide the identification of the smart device with the terminal, which is sent to the server after read by the terminal. The server associates the identification of the smart device and the one of the wireless access point also sent from the terminal.

The password obtaining module 920 is configured to receive the access password of the wireless access point directly or indirectly sent from the wireless access point through the preset channel.

The network access module 930 is configured to link to the network provided by the wireless access point according to the access password received by the password obtaining module 920.

In sum, according to the apparatus for network access of the present embodiment, the identifications of the smart device and wireless access point are read and identified via the terminal and then sent to the server, and the connection between the smart device and the wireless access point is achieved through the server, thereby linking the smart device to the network. Therefore, the problem relating to the limitation to the application of the current methods for wireless network access and lack of feasibility and versatility is solved and the method for linking the smart device to network is simplified, and further feasibility and versatility are enhanced.

Figure 11:
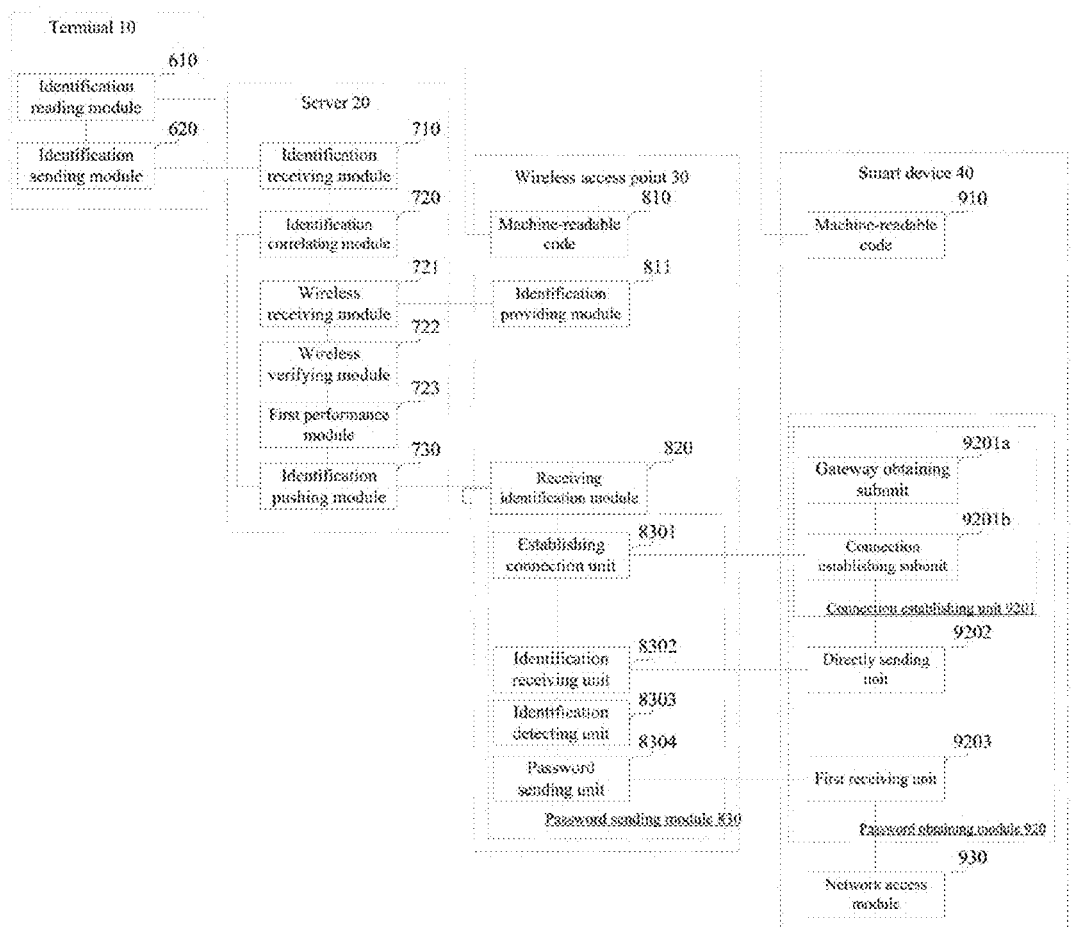
FIG. 11 is a block diagram of a system for network access according to another embodiment of the present disclosure.

FIG. 11 shows a block diagram of the system for network access according to another embodiment of the present disclosure. The present embodiment is illustratively described by applying the system for network access to the environment as shown in FIG. 1. The system for network access may include: the terminal 10, server 20, wireless access point 30 and smart device 40.

In some embodiments, the terminal 10 may include the identification reading module 610 and identification sending module 620.

The identification reading module 610 is configured to read the identifications provided by the wireless access point and smart device.

In some embodiments, in the first implementation, the identification reading module 610 may include a first reading unit and a second reading unit.

The first reading unit is configured to read the identification provided by the wireless access point via the first predetermined way at the first moment.

The second reading unit is configured to read the identification of the smart device via the second predetermined way at the second moment. The time period from the first moment to the second moment is less than a predetermined threshold value.

The identification sending module 620 is configured to send the identifications of the wireless access point and smart device read by the identifier reading module 610 to the server.

In the second implementation, the identifier reading module 610 includes a third reading unit and a fourth reading unit.

The third reading unit is configured to read the identification provided by the wireless access point via the first predetermined way at the third moment.

The fourth reading unit is configured to read the identification of the smart device via the second predetermined way at the fourth moment.

The identification sending module 620 is configured to send the identification of the wireless access point and the identifier of the terminal to the server, such that the server generates the binding relationship between the identification of the wireless access point and the identifier of the terminal.

The identification sending module 620 is also configured to send the identification of the smart device and the identifier of the terminal to the server, such that the server finds the identification of the wireless access point bound with the terminal according to the binding relationship and the identifier of the terminal and then associates the found identification of the wireless access point and the one of the smart device.

In some embodiments, the server 20 includes a machine-readable code 710, identification correlating module 720, wireless receiving module 721, wireless verifying module 722, first performing module 723 and identification pushing module 730.

In some embodiments, the machine-readable code 710 is configured to receive the identifications of the wireless access point and the smart device, which are sent after respectively read from the wireless access point and the smart device by the terminal.

In some embodiments, in the first implementation, the identification receiving module 710 is configured to receive the identifications of the wireless access point and the smart device simultaneously sent from the terminal.

Wherein, the identification of the wireless access point is read from the wireless access point through the first predetermined way at the first moment by the terminal. The identification of the smart device is read from the smart device through the second predetermined way at the second moment by the terminal.

In the second embodiment, the identification receiving module 710 includes a first receiving unit, a binding generation unit and a second receiving unit.

The first receiving unit is configured to receive the identification of the wireless access point and the identifier of the terminal which are sent from the terminal. The identification of the wireless access point is read from the wireless access point through the first predetermined way at the third moment by the terminal.

The binding generation unit is configured to generate the binding relationship between the identification of the wireless access point and the identifier of the terminal.

The second receiving unit is configured to receive the identification of the smart device and the identifier of the terminal sent from the terminal.

Accordingly, the identification correlating module 720 may include a binding search unit and an identification correlating unit.

The binding search unit is configured to find the identification of the wireless access point bound with the terminal according to the identifier of the terminal and the binding relationship.

The identification correlating unit is configured to associate the found identification of the wireless access point and the one of the smart device.

The identification correlating module 720 is configured to associate the identification of the wireless access point with the one of the smart device received by the machine-readable code 710.

The wireless receiving module 721 is configured to receive the identification of the wireless access point sent from the wireless access point.

The wireless verifying module 722 is configured to verify whether the wireless access point is pre-registered according to the identification of the wireless access point.

The first performing module 723 is configured to perform the step of sending the identification of the smart device to the wireless access point in the case that the wireless access point is detected as pre-registered one.

The identification pushing module 730 is configured to send the associated identification of the smart device to the wireless access point, such that the wireless access point directly or indirectly sends the access password of the wireless access point to the smart device according to the identification of the smart device. The smart device is linked to the network provided by the wireless access point according to the access password.

In some embodiments, the wireless access point 30 comprises a machine-readable code 810, an identification sending module 811, a receiving identification module 820 and a password sending module 830.

The machine-readable code 810 is configured to provide identification of the wireless access point with the terminal, which is sent to the server after read by the terminal. The server associates the identification of the wireless access point and the one of the smart device also sent from the terminal.

The identification sending module 811 is configured to send the identification of the wireless access point to the server, such that the server verifies whether the wireless access point is pre-registered according to the identification of the wireless access point.

The receiving identification module 820 is configured to receive the identification of the smart device sent from the server, which is sent after correlating the identification of the wireless access point and the one of the smart device by the server.

The password sending module 830 is configured to send the access password of the wireless access point to the smart device directly or indirectly through preset channel according to the identification of the smart device received by the receiving identification module 820, such that the smart device is linked to the network provided by the wireless access point according to the access password.

In some embodiments, the password sending module 830 includes an establishing connection unit 8301, an identification receiving unit 8302, an identification detecting unit 8303 and a password sending unit 8304.

The establishing connection unit 8301 is configured to establish the connection with the smart device through the preset channel.

The identification receiving unit 8302 is configured to receive the identification of the smart device sent from the smart device through the preset channel.

The identification detecting unit 8303 is configured to detect whether the identification of the smart device received through the preset channel is the same as the one received from the server.

The password sending unit 8304 is configured to send the access password of the wireless access point to the smart device through the preset channel in the case that the detection result is that they are same.

The smart device 40 includes the machine-readable code 910, password obtaining module 920 and network access module 930.

The machine-readable code 910 is configured to provide the identification of the smart device with the terminal, which is sent to the server after read by the terminal. The server associates the identification of the smart device and the one of the wireless access point also sent from the terminal.

The password obtaining module 920 is configured to receive the access password of the wireless access point which is sent from the wireless access point through the preset channel directly or indirectly.

In some embodiments, the password obtaining module 920 includes a connection establishing unit 9201 and directly sending unit 9202 as well as the first receiving unit 9203.

The connection establishing unit 9201 is configured to establish the connection with the wireless access point via the preset channel provided by the wireless access point.

In some embodiments, the connection establishing unit 9201 includes a gateway obtaining subunit 9201*a* and connection establishing subunit 9201*b*.

The gateway obtaining subunit 9201*a* is configured to obtain the gateway address of the wireless access point through the preset channel in a predetermined manner.

The connection establishing subunit 9201*b* is configured to establish the connection with the wireless access point according to the gateway address of the wireless access point.

In some embodiments, the predetermined manner may include:

obtaining through the interface of the underlying application program of the smart device, or obtaining through parsing the host name of the wireless access point by the domain name server; or obtaining through broadcast user datagram protocol UDP packet.

The directly sending unit 9202 is configured to send the identification of the smart device to the wireless access point through the preset channel, such that the wireless access point detects whether the identification of the smart device received from the preset channel is the same as the one received from the server. If the detection result that they are same, the access password of the wireless access point is sent to the smart device through the preset channel.

The first receiving unit 9203 is configured to receive the access password of the wireless access point that is sent through the preset channel by the wireless access point.

The network access module 930 is configured to access the network provided by the wireless access point according to the access password received from the password obtaining module 920.

In sum, the system for access network provided by the present embodiment achieves the access of the smart device to the network through reading and identifying the identifications of the smart device and wireless access point via the terminal and then sending them to server, and achieving the connection between the smart device and wireless access point via the server, such that the problem relating to the limitation to the application of the methods for wireless network access and lack of feasibility and versatility is solved and the method for linking the smart device to network is simplified, and further feasibility and versatility are enhanced. Meanwhile, as an exemplary embodiment shown in FIG. 10, the system for network access provided by the present embodiment provides two different apparatus for reading the identifications of the wireless access point and smart device from terminal side, which improves the feasibility of the method for network access provided by the present example. Furthermore, the server verifies the identity of the wireless access point before delivery of information between the server and the wireless access point such that the security of the method for network access is enhanced. Furthermore, the information transfer among the smart device, wireless access point and server can be encrypted and the information can be message-digested before sending, thereby improving the security and conciseness of the information transfer.

Figure 12:
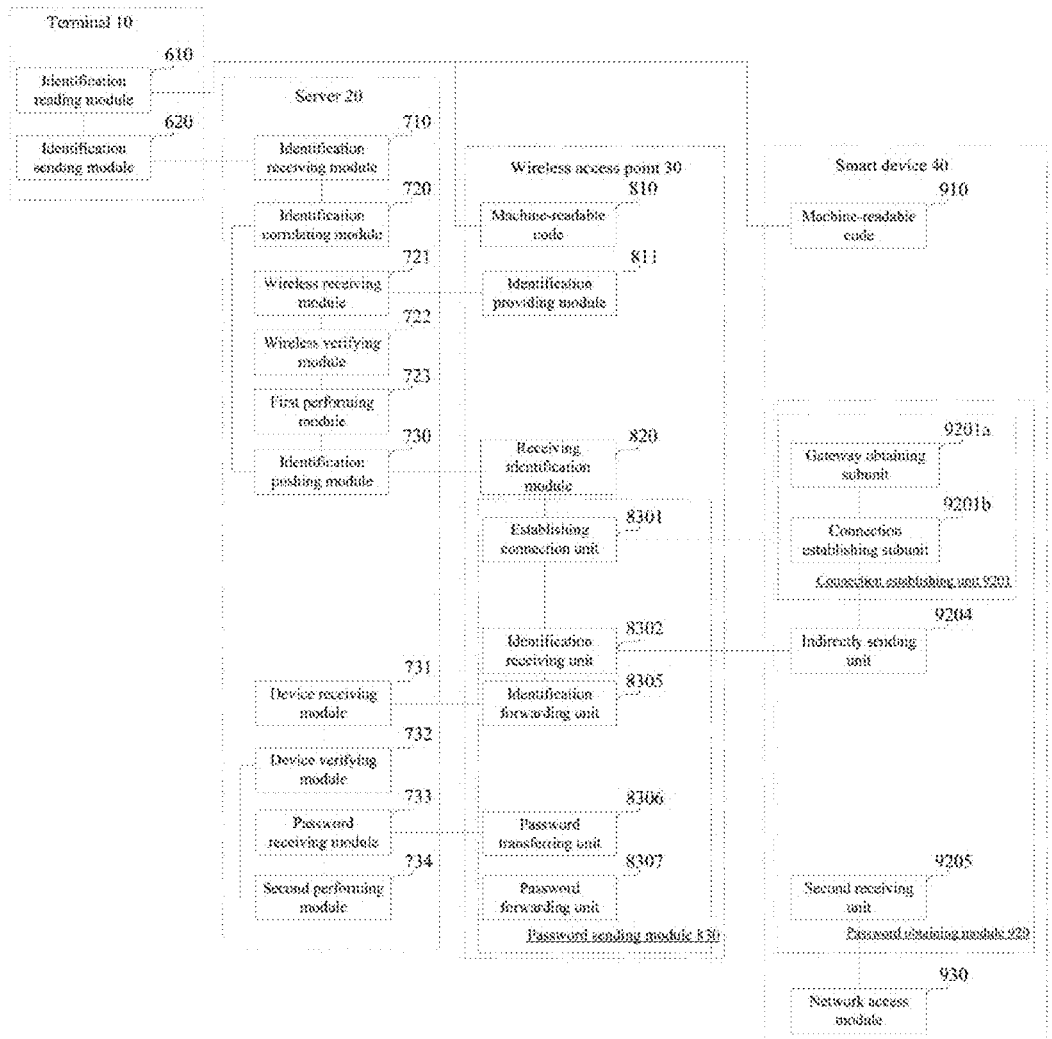
FIG. 12 is a block diagram of a system for network access according to another embodiment of the present disclosure.

FIG. 12 shows a block diagram of a system for network access according to another embodiment of the present disclosure. The present embodiment is also illustratively described by applying the system to the environment as shown in FIG. 1. The system for network access may include: the terminal 10, server 20, wireless access point 30 and smart device 40.

The terminal 10 includes identification reading module 610 and identification sending module 620.

The identification reading module 610 is configured to read the identifications provided by the wireless access point and smart device.

In some embodiments, in the first implementation, the identification reading module 610 includes the first reading unit and the second reading unit.

The first reading unit is configured to read the identification provided by the wireless access point via the first predetermined way at the first moment.

The second reading unit is configured to read the identification of the smart device via the second predetermined way at the second moment. The time period from the first moment to the second moment is less than the predetermined threshold value.

The identification sending module 620 is configured to send the identification of the wireless access point and the one of the smart device to the server read by the identification reading module 610.

In the second implementation, the identification reading module 610 includes the third reading unit and the fourth reading unit.

The third reading unit is configured to read the identification provided by the wireless access point via the first predetermined way at the third moment.

The fourth reading unit is configured to read the identification of the smart device via the second predetermined way at the fourth moment.

The identification sending module 620 is configured to send the identification of the wireless access point and the identifier of the terminal to the server, such that the server generates the binding relationship between the identification of the wireless access point and the identifier of the terminal.

The identification sending module 620 is also configured to send the identification of the smart device and the identifier of the terminal to the server, such that the server finds the identification of the wireless access point bound with the terminal according to the binding relationship and the identifier of the terminal and then associates the found identification of the wireless access point and the one of the smart device.

The server 20 includes the identification receiving module 710, identification correlating module 720, wireless receiving module 721, wireless verifying module 722, the first performing module 723 and the identification pushing module 730, device receiving module 731, device verifying module 732, password receiving module 733 and the second performing module 734.

The identification receiving module 710 is configured to receive the identifications of the wireless access point and the smart device, which are sent after read from the wireless access point and the smart device by the terminal.

In some embodiments, in the first implementation, the identification receiving module 710 is configured to receive the identifiers of the wireless access point and the smart device sent from the terminal simultaneously.

In some embodiments, the identification of the wireless access point is read from the wireless access point through the first predetermined way at the first moment by the terminal. The identification of the smart device is read from the smart device through the second predetermined way at the second moment by the terminal.

In the second implementation, the identification receiving module 710 includes the first receiving unit, binding generation unit and the second receiving unit.

The first receiving unit is configured to receive the identification of the wireless access point and the identifier of the terminal sent from the terminal. The identification of the wireless access point is read from the wireless access point through the first predetermined way at the third moment by the terminal.

The binding generation unit is configured to generate the binding relationship between the identification of the wireless access point and the identifier of the terminal.

The second receiving unit is configured to receive the identification of the smart device and the identifier of the terminal sent from the terminal.

Accordingly, the identification correlating module 720 may include the binding search unit and identification correlating unit.

The binding search unit is configured to find the identification of the wireless access point bound with the terminal according to the identifier of the terminal and the binding relationship.

The identification correlating unit is configured to associate the found identification of the wireless access point and the identification of the smart device.

The identification relating module 720 is configured to associate the identification of the wireless access point with the one of the smart device received by the machine-readable code 710.

The wireless receiving module 721 is configured to receive the identification of the wireless access point sent from the wireless access point.

The wireless verifying module 722 is configured to verify whether the wireless access point is pre-registered according to the identification of the wireless access point.

The first performing module 723 is configured to perform the step of sending the identification of the smart device to the wireless access point in the case that the wireless access point is detected as pre-registered one.

The identification pushing module 730 is configured to send the associated identification of the smart device to the wireless access point, such that the wireless access point directly or indirectly sends the access password of the wireless access point to the smart device according to the identification of the smart device. The smart device is linked to the network provided by the wireless access point according to the access password.

The device receiving module 731 is configured to receive the identification of the smart device forwarded from the smart device via the wireless access point. The identification of the smart device is initially sent from the smart device to the wireless access point after the connection between the smart device and the wireless access point is established through the preset channel provided by the wireless access point, and then forwarded to the server via the wireless access point.

The device verifying module 732 is configured to verifying whether the smart device is pre-registered according to the identification of the smart device.

The password receiving module 733 is configured to receive the access password of the wireless access point sent from the wireless access point.

The second performing module 734 is configured to send the access password of the wireless access point to the smart device through the wireless access point in the case that the detection result is that the smart device is pre-registered. The access password of the wireless access point is initially sent to the wireless access point by the server and then forwarded to the smart device through the preset channel by the wireless access point.

In some embodiments, the wireless access point 30 may include the machine-readable code 810, identification sending module 811, receiving identification module 820 and password sending module 830.

The machine-readable code 810 is configured to provide identification of the wireless access point with the terminal, which is sent to the server after read by the terminal. The server associates the identification of the wireless access point and the one of the smart device also sent from the terminal.

The identification sending module 811 is configured to send the identification of the wireless access point to the server, such that the server verifies whether the wireless access point is pre-registered according to the identification of the wireless access point.

The receiving identification module 820 is configured to receive the identification of the smart device sent from the server, which is sent after correlating the identification of the wireless access point and the one of the smart device by the server.

The password sending module 830 is configured to send the access password of the wireless access point to the smart device directly or indirectly through the preset channel according to the identification of the smart device received by the receiving identification module 820, such that the smart device is linked to the network provided by the wireless access point according to the access password.

In some embodiments, the password sending module 830 includes the establishing connection unit 8301, identification receiving unit 8302, identification forwarding unit 8305, password transferring unit 8306 and password forwarding unit 8307.

The establishing connection unit 8301 is configured to establish the connection with the smart device through the preset channel.

The identification receiving unit 8302 is configured to receive the identification of the smart device sent from the smart device through the preset channel.

The identification forwarding unit 8305 is configured to forward the identification of the smart device to the server, such that the server verifies whether the smart device is pre-registered according to the identification of the smart device.

The password transferring unit 8306 is configured to send the access password of the wireless access point to the server.

The password forwarding unit 8307 is configured to receive the access password of the wireless access point sent from the server and then forward the access password of the wireless access point to the smart device through preset channel. The access password of the wireless access point is sent by the server in the case that the detection result is that the smart device is pre-registered.

The smart device 40 includes the machine-readable code 910, password obtaining module 920 and network access module 930.

The machine-readable code 910 is configured to provide identification of the smart device with the terminal, which is sent to the server after read by the terminal. The server associates the identification of the smart device and the one of the wireless access point also sent from the terminal.

The password obtaining module 920 is configured to receive the access password of the wireless access point which is sent from the wireless access point through the preset channel directly or indirectly.

Specifically, the password obtaining module 920 includes the connection establishing unit 9201 and indirectly sending unit 9204 as well as the second receiving unit 9205.

The connection establishing unit 9201 is configured to establish the connection with the wireless access point via the preset channel provided by the wireless access point.

Specifically, the connection establishing unit 9201 includes the gateway obtaining subunit 9201*a* and connection establishing subunit 9201*b*.

The gateway obtaining subunit 9201*a* is configured to obtain the gateway address of the wireless access point through the preset channel in a predetermined manner.

The connection establishing subunit 9201*b* is configured to establish the connection with the wireless access point according to the gateway address of the wireless access point.

The predetermined manner includes:

obtaining through running an application programming interface of the smart device, or obtaining through parsing the host name of the wireless access point by the domain name server; or obtaining through broadcast user datagram protocol UDP packet.

The indirectly sending unit 9204 is configured to send the identification of the smart device to the wireless access point through the preset channel, wherein the identification of the smart device is forwarded to the server by the wireless access point, such that the server verifies whether the smart device is pre-registered according to the identification of the smart device.

The second receiving unit 9205 is configured to receive the access password of the wireless access point sent by the server, which is initially sent to the wireless access point and then forwarded to the smart device through the preset channel by the wireless access point in the case that the detection result is that the smart device is pre-registered.

The network access module 930 is configured to access the network provided by the wireless access point according to the access password received from the password obtaining module 920.

In sum, the system for access network provided by the present embodiment achieves the access of the smart device trough reading and identifying the identifications of the smart device and wireless access point via terminal and then sending them to server, and achieving the connection between the smart device and wireless access point via the server, such that the problem relating to the limitation to the application of the methods for wireless network access and lack of feasibility and versatility is solved and the method for linking the smart device to network is simplified, and further feasibility and versatility are enhanced. Meanwhile, as the more preferable embodiment over the ones as shown in FIGS. 10 and 11, the system for network access provided by the present embodiment provides two different apparatus for reading the identifications of the wireless access point and smart device from terminal side, which improves the feasibility of the method for network access provided by the present embodiment. Furthermore, the server verifies the identity of the wireless access point before transfer of information between the server and the wireless access point such that the security of the method for network access is enhanced. Furthermore, the information transfer among the smart device, wireless access point and server can be encrypted and the information can be message-digested before sending, thereby improving the security and conciseness of the delivery of the information. Additionally, the access password is sent to the smart device after successfully verifying the identity of the smart device and encrypting, which provides adequate assurance for the security and reliability of the network access method provided by the present embodiment.

It should be understood that reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments. Furthermore, as used herein, the language "and/or" is intended to include the any or all combination of or more associated terms.

The serial numbers of the foregoing embodiments of the present disclosure are merely for the convenience of description, and do not imply the preference among the embodiments.

The skilled in the art can understand that all or part of steps in the aforesaid embodiments can be implemented by the hardware, or by a program instructing the relevant hardware. The program can be stored in a computer-readable storage medium. The said storage medium may be a read-only memory, disk or CD and the like.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method for providing network access through a wireless access point to a smart device, the method comprising:
   receiving from a terminal device, by a server comprising a processor and a non-transitory storage medium, a first identification identifying the wireless access point and a first terminal identifier of the terminal device;
   receiving, by the server from the terminal device, a second identification identifying the smart device and a second terminal identifier of the terminal device;
   associating, by the server, the wireless access point with the smart device in instances when the first terminal identifier corresponds to the second terminal identifier; and
   sending, by the server, the second identification identifying the associated smart device to the wireless access point, wherein the wireless access point provides network access authentication information to the associated smart device so that the associated smart device can access a network provided by the wireless access point with the network access authentication information, wherein the access to the network provided by the wireless access point to the associated smart device depends on:
   pre-registration, by the server, of the wireless access point based on the first identification identifying the wireless access point, and
   the sending of the second identification identifying the smart device to the wireless access point.

2. The method of claim 1, before sending the second identification of the associated smart device to the wireless access point, further comprising:
   verifying whether the wireless access point is pre-registered based on the first identification identifying the wireless access point; and
   in instances when the wireless access point is pre-registered, sending the second identification identifying the associated smart device to the wireless access point.

3. The method of claim 1, wherein the wireless access point provides network access authentication information to the associated smart device through the following:
   establishing, by the associated smart device, a connection with the wireless access point;

receiving, by the wireless access point, identification of the associated smart device from the associated smart device through the connection; and in instances when the identification from the associated smart device corresponds to the second identification identifying the associated smart device received from the server, sending, by the wireless access point, network access authentication information required by the wireless access point to the associated smart device through the connection.

4. The method of claim 1, wherein the wireless access point provides network access authentication information to the associated smart device through the following:

establishing, by the associated smart device, a connection with the wireless access point;

receiving, by the wireless access point, identification of the associated smart device from the associated smart device;

forwarding, by the wireless access point, the identification of the associated smart device to the server wherein the server determines whether the associated smart device is a pre-registered based on the identification of the associated smart device;

receiving, by the wireless access point, the network access authentication information required for the wireless access point from the server, in instances when the associated smart device is pre-registered; and sending, by the wireless access point, the network access authentication information to the associated smart device through the connection.

5. The method of claim 3, wherein establishing a connection with the associated smart device further comprises one of the following:

obtaining a gateway address of the wireless access point by an application programming interface of the associated smart device;

obtaining a gateway address of the wireless access point through parsing the hostname of the wireless access point by a domain name server; and obtaining a gateway address of the wireless access point from a broadcast of a user datagram protocol packet.

6. The method of claim 1, wherein at least one of the first identification identifying the wireless access point and second identification identifying the smart device is obtained by reading a machine-readable code which comprises identification.

7. The method of claim 1, wherein at least one of the first identification identifying the wireless access point and second identification identifying the identifying the smart device is obtained through wireless near field communication.

8. A method for providing network access through a wireless access point to a smart device, the method comprising:

in a terminal comprising a hardware processor and a non-transitory storage medium and a plurality of user accounts:

obtaining, by the hardware processor of the terminal, a first identification identifying the wireless access point;

sending, by the hardware processor of the terminal, the first identification identifying the wireless access point and a first user account identifier of the terminal to a server;

obtaining, by the hardware processor of the terminal, a second identification identifying a smart device and a second user account identifier of the terminal, wherein the first user account identifier either corresponds to the second user account identifier or is different than the second user account identifier; and sending, by the hardware processor of the terminal, the second identification identifying the smart device and the second user account identifier of the terminal to the server, wherein:

the server associates the first identification identifying the wireless access point with the second identification identifying the smart device in instances when the first user account identifier of the terminal corresponds to the second user account identifier of the terminal; and the network access is provided through the wireless access point to the smart device depending on:

the first identification identifying the wireless access point being sent by the hardware processor of the terminal to the server so that the server can pre-register the wireless access point based on the first identification identifying the wireless access point, and the second identification identifying the smart device being sent by the hardware processor of the terminal to the server so that the server can send the associated second identification identifying the smart device to the wireless access point.

9. A server apparatus comprising:

a processor and a non-transitory storage medium accessible to the processor, wherein the non-transitory storage medium stores modules comprising:

an identification receiving module that when executed by the processor, causes the processor to receive, from a terminal, a first identification identifying a wireless access point associated with a first terminal identifier identifying the terminal that sent the first identification identifying the wireless access point, and receive, from a terminal, a second identification identifying a smart device associated with a second terminal identifier identifying the terminal that sent the second identification identifying the smart device;

an identification relating module that when executed by the processor, causes the processor to associate the wireless access point with the smart device in instances when the first terminal identifier is the same as the second terminal identifier; and an identification pushing module that when executed by the processor, causes the processor to send the second identification identifying the associated smart device to the wireless access point, wherein the wireless access point provides network access authentication information to the associated smart device so that the associated smart device can access a network provided by the wireless access point with the network access authentication information, wherein the access to the network provided by the wireless access point to the associated smart device depends on:

pre-registration, by the server, of the wireless access point based on the first identification identifying the wireless access point, and the sending of the second identification identifying the smart device to the wireless access point.

10. The server apparatus of claim 9, wherein the identification relating module comprises:

a binding search unit that when executed by the processor, causes the processor to find the first identification information identifying the wireless access point that is associated with the same terminal identifier as the smart device; and an identification relating unit that when executed by the processor, causes the processor to associate the wireless access point with the smart device when the second terminal identifier received with the second identification identifying the smart device is the same terminal identifier as the first terminal identifier, which is bound by the server with the wireless access point.

11. The server apparatus of claim 9, wherein at least one of the first identification identifying the wireless access point and second identification identifying the smart device is obtained by the associated terminal by reading a machine-readable code which comprises the respective identification.

12. The server apparatus of claim 9, wherein at least one of the first identification identifying the wireless access point and second identification identifying the smart device is obtained by the associated terminal through wireless near field communication.

13. The server apparatus of claim 9, wherein the non-transitory storage medium further stores modules comprising:

a wireless receiving module that when executed by the processor, causes the processor to receive the first identification identifying the wireless access point from the wireless access point;

a wireless verifying module that when executed by the processor, causes the processor to verify whether the wireless access point is pre-registered based on the first identification of the wireless access point; and a first performing module that when executed by the processor, causes the processor to send the second identification of the smart device to the wireless access point in instances when the wireless access point is pre-registered.

14. The server apparatus of claim 9, wherein the non-transitory storage medium further stores modules comprising:

a device receiving module that when executed by the processor, causes the processor to receive the second identification identifying the smart device from the wireless access point after the smart device establishes a connection with the wireless access point;

a device verifying module that when executed by the processor, causes the processor to verify whether the smart device is pre-registered based on the second identification identifying the smart device; and a second performing module that when executed by the processor, causes the processor to provide network access authentication information of the wireless access point to the smart device through the wireless access point in instances when the smart device is pre-registered, wherein the network access authentication information is initially sent to the wireless access point and then forwarded to the smart device by the wireless access point.

15. The server apparatus of claim 14, wherein the smart device establishes the connection with the wireless access point according to a gateway address of the wireless access point which is obtained by a method selected from the group consisting of:

running an application programming interface of the smart device;

parsing the hostname of the wireless access point by a domain name server; and broadcasting a user datagram protocol packet.

* * * * *